United States Patent
Shimizu

(10) Patent No.: US 11,248,141 B2
(45) Date of Patent: Feb. 15, 2022

(54) ACTIVE ENERGY CURABLE RESIN COMPOSITION, HARD COAT LAMINATED FILM, AND FILM FOR APPLICATION TO GLASS

(71) Applicant: RIKEN TECHNOS CORPORATION, Tokyo (JP)

(72) Inventor: Motohiro Shimizu, Tokyo (JP)

(73) Assignee: RIKEN TECHNOS CORPORATION

( * ) Notice: Subject to any disclaimer, the term of this patent is extended or adjusted under 35 U.S.C. 154(b) by 107 days.

(21) Appl. No.: 16/618,651

(22) PCT Filed: Apr. 23, 2018

(86) PCT No.: PCT/JP2018/016426
§ 371 (c)(1),
(2) Date: Dec. 2, 2019

(87) PCT Pub. No.: WO2018/221072
PCT Pub. Date: Dec. 6, 2018

(65) Prior Publication Data
US 2020/0095414 A1 Mar. 26, 2020

(30) Foreign Application Priority Data

May 30, 2017 (JP) .............................. JP2017-106093

(51) Int. Cl.
| | | |
|---|---|---|
| C08F 220/18 | (2006.01) | |
| C08F 220/36 | (2006.01) | |
| C09D 133/14 | (2006.01) | |
| C03C 17/32 | (2006.01) | |
| C08F 220/30 | (2006.01) | |
| C08F 220/34 | (2006.01) | |
| C08L 33/12 | (2006.01) | |
| C09D 133/12 | (2006.01) | |
| C08J 7/043 | (2020.01) | |
| C08J 7/046 | (2020.01) | |

(52) U.S. Cl.
CPC .......... *C09D 133/14* (2013.01); *C03C 17/324* (2013.01); *C08F 220/18* (2013.01); *C08F 220/30* (2013.01); *C08F 220/34* (2013.01); *C08J 7/043* (2020.01); *C08J 7/046* (2020.01); *C08L 33/12* (2013.01); *C09D 133/12* (2013.01); *C08F 220/301* (2020.02); *C08F 220/343* (2020.02); *C08L 2203/16* (2013.01)

(58) Field of Classification Search
CPC ...... C08F 220/18; C08F 220/36; C08L 33/12; C09D 133/12
See application file for complete search history.

(56) References Cited

U.S. PATENT DOCUMENTS

| | | | |
|---|---|---|---|
| 6,372,355 B1 | 4/2002 | Noda et al. | |
| 2009/0054543 A1* | 2/2009 | Nozawa | G03F 7/027 522/73 |
| 2012/0243115 A1* | 9/2012 | Takamiya | C08F 290/067 359/894 |

FOREIGN PATENT DOCUMENTS

| | | | | |
|---|---|---|---|---|
| JP | 10060307 | A | * | 3/1998 |
| JP | 2000177070 | A | | 6/2000 |
| JP | 2003183339 | A | | 7/2003 |
| JP | 2004131549 | A | | 4/2004 |
| JP | 2004182924 | A | | 7/2004 |
| JP | 2007-230093 | A | * | 9/2007 |
| JP | 2008231304 | A | | 10/2008 |
| JP | 2010-083960 | A | * | 4/2010 |
| JP | 2010100742 | A | | 5/2010 |
| JP | 2012206378 | A | | 10/2012 |
| JP | 2013204001 | A | | 10/2013 |
| JP | 2016027098 | A | | 2/2016 |
| JP | 2016068423 | A | | 5/2016 |
| JP | 2016196600 | A | | 11/2016 |
| WO | 2011155139 | A1 | | 12/2011 |

OTHER PUBLICATIONS

Machine translation into English of JP 2010-083960A; Terada (Year: 2010).*
PCT/JP2018/016426 International Search Report dated Jul. 24, 2018; 2 pgs.
PCTJP2018016426 International Preliminary Report on Patentability dated Dec. 12, 2019, 11 pgs.

(Continued)

*Primary Examiner* — Karuna P Reddy
(74) *Attorney, Agent, or Firm* — Bracewell LLP; Brad Y. Chin

(57) ABSTRACT

Embodiments provide an active energy curable resin composition containing (A) 100 parts by mass of a UV-absorbing polymer and (B) 20-600 parts by mass of a polyfunctional (meth)acrylate. The UV-absorbing polymer (A) contains: (a1) 10-60 mol % of a structural unit derived from a (meth)acrylate including one or more of one or more types of backbone selected from the group consisting of a benzotriazole backbone, a triazine backbone, and a benzophenone backbone per molecule; (a2) 10-50 mol % of a structural unit derived from an alkyl (meth)acrylate; and (a3) 10-70 mol % of a structural unit derived from a compound including one or more isocyanate groups per molecule; the sum of the structural unit derived from a (meth)acrylate of component (a1), the structural unit derived from an alkyl (meth)acrylate of component (a2), and the structural unit derived from an isocyanate-group-including compound of component (a3) being 100 mol %.

15 Claims, 5 Drawing Sheets

(56) References Cited

OTHER PUBLICATIONS

EP18809558.2 Partial Supplementary European Search Report dated Jan. 27, 2021, 13 pgs.
EP18809558.2 Supplementary Search Report dated Aug. 10, 2021, 11 pgs.
JP2018-82694 Office Action dated Nov. 30, 2021, 9 pgs.

* cited by examiner

ACTIVE ENERGY CURABLE RESIN COMPOSITION, HARD COAT LAMINATED FILM, AND FILM FOR APPLICATION TO GLASS

CROSS REFERENCE TO RELATED APPLICATIONS

This application claims the benefit of and priority to PCT/JP2018/016426, filed on Apr. 23, 2018, entitled (translation), "ACTIVE ENERGY CURABLE RESIN COMPOSITION, HARD COAT LAMINATED FILM, AND FILM FOR APPLICATION TO GLASS," which claims the benefit of and priority to Japanese Patent Application No. 2017-106093, filed on May 30, 2017 which are hereby incorporated by reference in their entirety into this application.

BACKGROUND

Embodiments relate to an active energy ray curable resin composition capable of forming a hard coat having excellent weather resistance. Embodiments also relate to a hard coat laminated film formed by using the active energy ray curable resin composition, and a glass window film used in a state where it is applied to the outdoor side of glass for structure such as window glass (hereinafter, may be abbreviated as a "glass window film for exterior use").

BACKGROUND ART

Conventionally, a hard coat laminated film has been used in a state where it is applied to glass for the purposes of protection and prevention of scattering and the like of glasses such as window glass for building, a window of an automobile, and a display face plate of an image display device. Heretofore, when the hard coat laminated film is applied to the window glass of building, the hard coat laminated film has been generally applied to the indoor side from viewpoints of weather resistance and abrasion resistance. However, when the hard coat laminated film is applied to the indoor side, there are disadvantages that a working space is required indoors, and a sufficient working space cannot be secured, which may cause restricted work. There has been required a hard coat laminated film having weather resistance, preferably weather resistance and abrasion resistance, which can be applied to the outdoor side of the window glass. From the same viewpoint, a hard coat laminated film for automobile window is also required to have weather resistance that allows application of the hard coat laminated film to the vehicle exterior side of a window, and preferably weather resistance and abrasion resistance. In recent years, an image display device has been developed for applications used in places that are exposed to direct sunlight such as car navigation and digital signage. Therefore, the hard coat laminated film for display face plate of the image display device is also required to have weather resistance that allows the development of the hard coat laminated film in such applications, and preferably weather resistance and abrasion resistance. (For example, see Patent Literature 1 and Patent Literature 2).

CITATION LIST

Patent Literature

PATENT LITERATURE 1: JP-A-2008-231304
PATENT LITERATURE 2: JP-A-2016-068423

SUMMARY

It is an object of the various embodiments provide an active energy ray curable resin composition capable of forming a hard coat having excellent weather resistance, a hard coat laminated film formed by using the active energy ray curable resin composition, and a glass window film for exterior use. It is another object of the various embodiments to provide an active energy ray curable resin composition capable of forming a hard coat having excellent weather resistance, abrasion resistance, and preferably transparency, yellowing resistance, crack resistance at film bending, and external appearance, a hard coat laminated film formed by using the active energy ray curable resin composition, and a glass window film for exterior use.

The present inventors made an extensive investigate, and as a result, have found that the problems can be solved with a specific active energy ray curable resin composition. Various aspects of the various embodiments for solving the problem are as follows.

An active energy ray curable resin composition containing: (A) 100 parts by mass of a UV-absorbing polymer; and (B) 20-600 parts by mass of a polyfunctional (meth)acrylate, wherein the UV-absorbing polymer (A) is comprised of: (a1) 10-60 mol % of a structural unit derived from a (meth) acrylate having one or more of one or more types of backbones selected from the group consisting of a benzotriazole backbone, a triazine backbone, and a benzophenone backbone per molecule; (a2) 10-50 mol % of a structural unit derived from an alkyl (meth)acrylate; and (a3) 10-70 mol % of a structural unit derived from a compound containing one or more isocyanate groups per molecule; and the sum of the structural unit derived from a (meth)acrylate as component (a1), the structural unit derived from an alkyl (meth)acrylate as component (a2), and the structural unit derived from an isocyanate group-containing compound as component (a3) is 100 mol %.

A hard coat laminated film including a hard coat formed of a coating material containing the active energy ray curable resin composition according to various embodiments.

A hard coat laminated film including a hard coat formed of a coating material containing the active energy ray curable resin composition according to various embodiments and a resin film layer in order from a surface on a side upon which sunlight is incident in an actual state of use.

A hard coat laminated film including a hard coat formed of a coating material containing the active energy ray curable resin composition according to various embodiments, an anchor coat, and a resin film layer in order from a surface on a side upon which sunlight is incident in an actual state of use, wherein the anchor coat is formed of a coating material containing a polymer comprised of a structural unit derived from a (meth)acrylate having one or more of one or more types of backbones selected from the group consisting of a benzotriazole backbone, a triazine backbone, and a benzophenone backbone per molecule.

A hard coat laminated film including a hard coat, an anchor coat, and a resin film layer in order from a surface on a side upon which sunlight is incident in an actual state of use, wherein the hard coat is formed of a first coating material containing a polymer comprised of a structural unit derived from a (meth)acrylate having one or more of one or more types of backbones selected from the group consisting of a benzotriazole backbone, a triazine backbone, and a benzophenone backbone per molecule; the anchor coat is formed of a second coating material containing a polymer comprised of a structural unit derived from a (meth)acrylate having one or more of one or more types of backbones selected from the group consisting of a benzotriazole backbone, a triazine backbone, and a benzophenone backbone per molecule; and the hard coat laminated film satisfies the following characteristics (i), (ii), and (iv): (i) a visible light transmittance of 80% or more; (ii) a UV transmittance of 1% or less; and (iv) adhesiveness of classification 4, classification 3, classification 2, classification 1, or classification 0 exhibited when (1) a test piece is set such that a hard coat side surface of the hard coat laminated film is an irradiated surface using a sunshine carbon arc type weather resistance tester specified in JIS B7753: 2007 in accordance with 6.10 weather resistance in JIS A5759: 2016, and the test piece is subjected to an accelerated weather resistance treatment for 1000 hours under conditions shown in Table 11 of 6.10 weather resistance in JIS A5759: 2016, and (2) the hard coat laminated film subjected to the accelerated weather resistance treatment is then subjected to a square lattice pattern test by forming a square lattice pattern cut on the hard coat laminated film from a hard coat surface side according to JIS K5600-5-6: 1999.

The hard coat laminated film according to various embodiments, wherein the hard coat is formed of a coating material that contains a polymer comprised of a structural unit derived from a (meth)acrylate having one or more of one or more types of backbones selected from the group consisting of a benzotriazole backbone, a triazine backbone, and a benzophenone backbone per molecule and is free of inorganic particles.

A glass window film for exterior use, including the hard coat laminated film according to various embodiments.

An article including a cured product of the active energy ray curable resin composition according to various embodiments.

A hard coat formed by using an active energy ray curable resin composition according to various embodiments has excellent weather resistance. A hard coat formed by using a preferable active energy ray curable resin composition according to various embodiments has excellent weather resistance, abrasion resistance, and preferably transparency, yellowing resistance, crack resistance at film bending, and external appearance. Therefore, a hard coat laminated film obtained by using the active energy ray curable resin composition according to various embodiments can be suitably used as a glass window film for exterior use for the purposes of protection, prevention of scattering, ultraviolet shielding, and infrared shielding and the like of window glass for building, a window of an automobile, and the like. Therefore, the hard coat laminated film obtained by using the active energy ray curable resin composition according to various embodiments can be suitably used as a hard coat laminated film for the purposes of protection, prevention of scattering, and the like of a display face plate in an image display device, particularly an image display device used in places receiving direct sunlight such as car navigation or digital signage.

DETAILED DESCRIPTION

Figure 1:
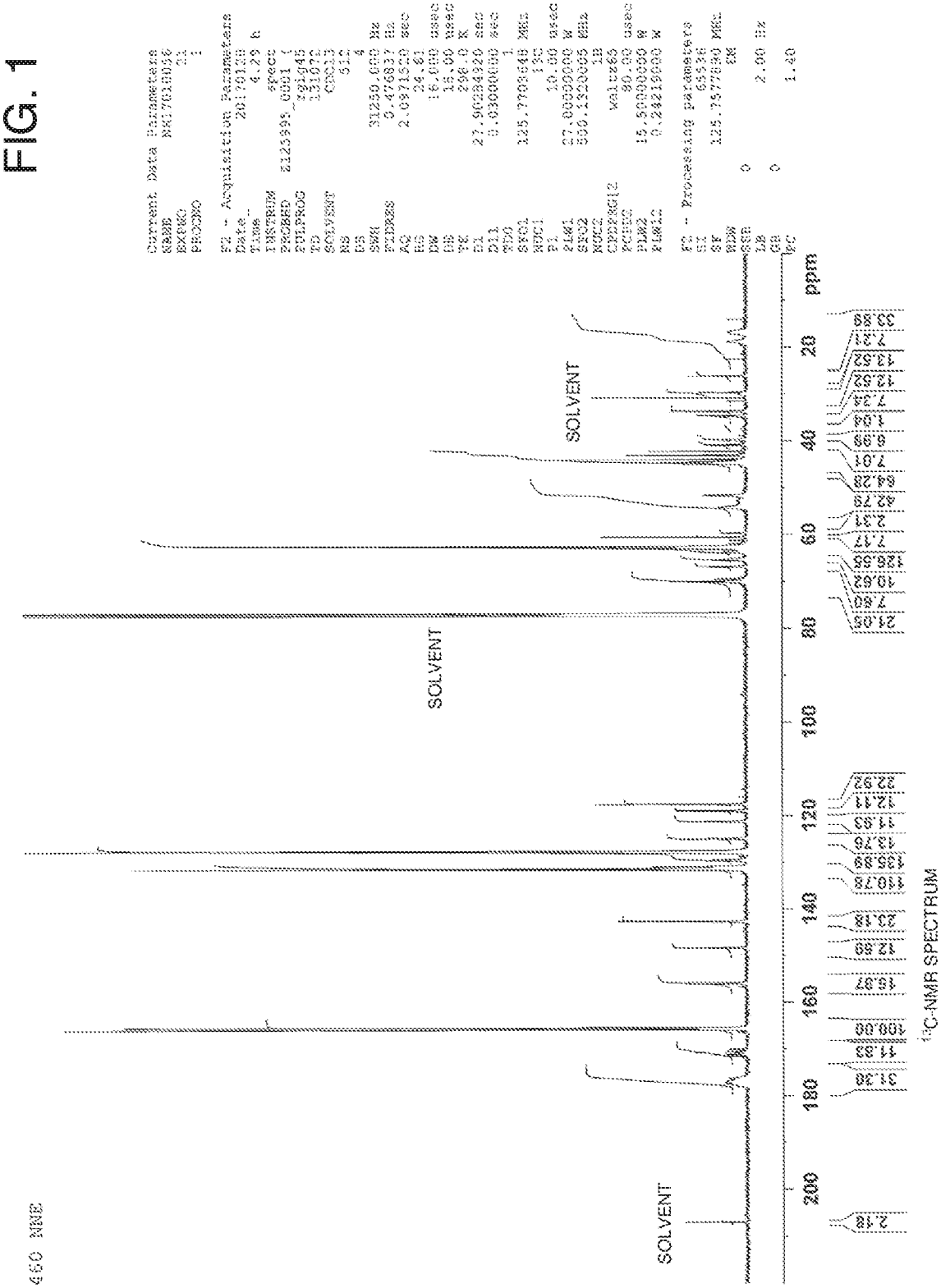
FIG. 1 is a $^{13}$C-NMR spectrum of an active energy ray curable resin composition according to the various embodiments (obtained by mixing and stirring 100 parts by mass of a component (A-1) in terms of solid content used in Examples, 65 parts by mass of a component (B-1) used in Examples, and 40 parts by mass of a component (B-2) used in Examples.

In the present specification, the term "film" is used mutually changeably or mutually replaceably with "sheet". In the present specification, the terms "film" and "sheet" are used in those which can be industrially rolled up. The term "plate" is used in those which cannot be industrially rolled up.

The term "resin" is used as a term including a resin mixture containing two or more resins, and a resin composition containing a component(s) other than resins.

In the present specification, sequentially laminating one layer and another layer means both directly laminating the layers and laminating the layers by interposing one or more layers, such as an anchor coat, between the layers.

The term "or more" for a numerical range is used to mean a certain numerical value or a numerical value exceeding the certain numerical value. For example, 20% or more means 20% or a value exceeding 20%. The term "or less" for a numerical range is used to mean a certain numerical value or a numerical value less than the certain numerical value. For example, 20% or less means 20% or a value less than 20%. Furthermore, the symbol "-" (or "to") for a numerical range is used to mean a certain numerical value, a numerical value greater than the certain numerical value and less than another numerical value, or the other numerical value. Here, the other numerical value is a numerical value greater than the certain numerical value. For example, 10-90% means 10%, greater than 10% and less than 90%, or 90%.

Except for Examples or unless otherwise specified, all numerical values used in the present specification and claims should be understood as being modified by the term "about". Without intending to limit the application of the doctrine of equivalents to the scope of the claims, each numerical value should be interpreted in light of significant figures and by applying ordinary rounding techniques.

1. Active Energy Ray Curable Resin Composition

An active energy ray curable resin composition according to various embodiments contains a UV-absorbing polymer (A). The active energy ray curable resin composition according to various embodiments usually contains a UV-absorbing polymer (A) and a polyfunctional (meth)acrylate (B). In the present specification, a (meth)acrylate means an acrylate or a methacrylate. Each component will be described below.

(A) UV-Absorbing Polymer

The UV-absorbing polymer as component (A) is a polymer (resin or oligomer) having a function of absorbing ultraviolet rays. The UV-absorbing polymer as component (A) has a function of absorbing ultraviolet rays, and functions to enhance the weather resistance of a hard coat laminated film to be formed. The UV-absorbing polymer as component (A) is a polymer (resin or oligomer), whereby problems such as bleeding out on the surface of a hard coat to be formed can be suppressed.

The UV-absorbing polymer as component (A) is comprised of (a1) a structural unit derived from a (meth)acrylate having one or more of one or more types of backbones selected from the group consisting of a benzotriazole backbone, a triazine backbone, and a benzophenone backbone per molecule. In one embodiment, the UV-absorbing polymer as component (A) is comprised of a structural unit derived from a (meth)acrylate having a benzotriazole backbone and a triazine backbone per molecule. In another embodiment, the UV-absorbing polymer as component (A) is comprised of a structural unit derived from a (meth) acrylate having a benzotriazole backbone and a benzophenone backbone per molecule. In still another embodiment, the UV-absorbing polymer as component (A) is comprised of a structural unit derived from a (meth)acrylate having a triazine backbone and a benzophenone backbone per molecule. In yet still another embodiment, the UV-absorbing polymer as component (A) is comprised of a structural unit derived from a (meth)acrylate having a benzotriazole backbone, a triazine backbone, and a benzophenone backbone per molecule. From a viewpoint of the weather resistance of a hard coat laminated film to be formed, the content of the structural unit derived from a (meth)acrylate as component (a1) in the UV-absorbing polymer as component (A) may be usually 1 mol % or more, preferably 5 mol % or more, more preferably 10 mol or more, and still more preferably 15 mol % or more with the sum of structural units derived from all constituent monomers as 100 mol %. Meanwhile, from a viewpoint of productivity when the UV-absorbing polymer as component (A) is produced, the content of the structural unit derived from a (meth)acrylate as component (a1) may be usually 60 mol % or less, preferably 50 mol % or less, more preferably 40 mol % or less, and still more preferably 30 mol % or less. In one embodiment, the content of the structural unit derived from a (meth)acrylate as component (a1) may be usually 1 mol % or more and 60 mol % or less, preferably 1 mol % or more and 50 mol % or less, 1 mol % or more and 40 mol % or less, 1 mol % or more and 30 mol % or less, 5 mol % or more and 60 mol % or less, 5 mol % or more and 50 mol % or less, 5 mol % or more and 40 mol % or less, 5 mol % or more and 30 mol % or less, 10 mol % or more and 60 mol % or less, 10 mol % or more and 50 mol % or less, 10 mol % or more and 40 mol % or less, 10 mol % or more and 30 mol % or less, 15 mol % or more and 60 mol % or less, 15 mol % or more and 50 mol % or less, 15 mol % or more and 40 mol % or less, or 15 mol % or more and 30 mol % or less.

The UV-absorbing polymer as component (A) preferably is comprised of: (a1) a structural unit derived from a (meth)acrylate having one or more of one or more types of backbones selected from the group consisting of a benzotriazole backbone, a triazine backbone, and a benzophenone backbone per molecule; (a2) a structural unit derived from an alkyl (meth)acrylate; and (a3) a structural unit derived from a compound containing one or more isocyanate groups per molecule. Each structural unit will be described below.

(a1) (Meth)Acrylate Having One or More of One or More Types of Backbones Selected from the Group Consisting of Benzotriazole Backbone, Triazine Backbone, and Benzophenone Backbone Per Molecule Component (a1) is a (meth)acrylate having one or more of one or more types of backbones selected from the group consisting of a benzotriazole backbone, a triazine backbone, and a benzophenone backbone per molecule. The benzotriazole backbone has a structure of the following formula (1). The triazine backbone has a structure of the following formula (2). The benzophenone backbone has a structure of the following formula (3). Each of these backbones has a function of absorbing ultraviolet rays. Although not intending to be bound by theory, the UV-absorbing function of component (A) is considered to be expressed by one or more types of backbones selected from the group consisting of a benzotriazole backbone, a triazine backbone, and a benzophenone backbone in the structural unit derived from the (meth)acrylate as component (a1). When the (meth)acrylate contains any of the above backbones even if the (meth) acrylate has an alkyl group, the (meth)acrylate is classified not into component (a2) but into component (a1).

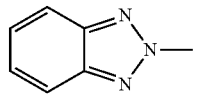
(1)

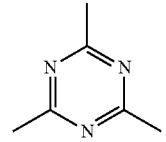
(2)

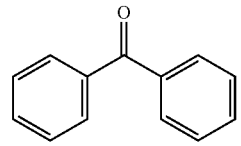
(3)

A (meth)acryloyl group contained in the (meth)acrylate as component (a1) is usually a (meth)acryloyloxy group. The number of the (meth)acryloyl groups contained in the (meth) acrylate as component (a1) is not particularly limited, but from a viewpoint of the bending resistance of a hard coat laminated film to be formed, the number may be usually 20 or less, preferably 6 or less, more preferably 3 or less, and still more preferably 1 to 2. In the present specification, (meth)acryloyl means acryloyl or methacryloyl.

Examples of the (meth)acrylate as component (a1) include (meth)acrylates having a benzotriazole backbone such as 2-[2-hydroxy-5-(2-methacryloyloxy-ethyl)phenyl]-2H-benzotriazole, 2-[2-hydroxy-5-(2-(acryloyloxy)-ethyl)phenyl]-2H-benzotriazole, 2-(2-hydroxy-5-methacryloyloxy-phenyl)-2H-benzotriazole, 2-(2-hydroxy-5-acryloyloxy-phenyl)-2H-benzotriazole, 2-(2-hydroxy-3-tert-butyl-5-methacryloyloxy-methylphenyl)-2H-benzotriazole, 2-(2-hydroxy-3-tert-butyl-5-acryloyloxy-methylphenyl)-2H-benzotriazole, 2-[2-hydroxy-3-tert-butyl-5-(2-methacryloyloxy-ethyl)phenyl]-5-chloro-2H-benzotriazole, 2-[2-hydroxy-3-tert-butyl-5-(2-acryloyloxy-ethyl)phenyl]-5-chloro-2H-benzotriazole, 2-[2-hydroxy-3-methyl-5-(8-methacryloyloxy-octyl)phenyl]-2H-benzotriazole, and 2-[2-hydroxy-3-methyl-5-(8-acryloyloxy-octyl)phenyl]-2H-benzotriazole.

Examples of the (meth)acrylate as component (a1) include (meth)acrylates having a triazine backbone such as 2-methacryloxyethylcarbamide acid 1-[3-hydroxy-4-{4,6-bis(2,4-dimethylphenyl)-1,3,5-triazine-2-yl}phenyloxy]-3-(2-ethylhexyloxy)-2-propyl, and 2-acryloxyethylcarbamide acid 1-[3-hydroxy-4-{4, 6-bis(2,4-dimethylphenyl)-1,3,5-triazine-2-yl}phenyloxy]-3-(2-ethylhexyloxy)-2-propyl.

Examples of the (meth)acrylate as component (a1) include (meth)acrylates having a benzophenone backbone such as 2-hydroxy-4-(2-methacryloyloxy-ethoxy)benzophenone, 2-hydroxy-4-(2-acryloyloxy-ethoxy)benzophenone, 2-hydroxy-4-(4-methacryloyloxy-butoxy)benzophenone, 2-hydroxy-4-(4-acryloyloxy-butoxy)benzophenone, 2,2'-dihydroxy-4-(2-methacryloyloxy-ethoxy)benzophenone, 2,2'-dihydroxy-4-(2-acryloyloxy-ethoxy)benzophenone, 2,4-dihydroxy-4'-(2-methacryloyloxy-ethoxy)benzophenone, 2,4-dihydroxy-4'-(2-acryloyloxy-ethoxy)benzophenone, 2,2',4-trihydroxy-4'-(2-methacryloyloxy-ethoxy)benzophenone, 2,2',4-trihydroxy-4'-(2-acryloyloxy-ethoxy)benzophenone, 2-hydroxy-4-(3-methacryloyloxy-2-hydroxypropoxy)benzophenone, 2-hydroxy-4-(3-acryloyloxy-2-hydroxypropoxy)benzophenone, 2-hydroxy-4-(3-methacryloyloxy-1-hydroxypropoxy)benzophenone, and 2-hydroxy-4-(3-acryloyloxy-1-hydroxypropoxy)benzophenone.

Among these, the (meth)acrylate as component (a1) is preferably a (meth)acrylate having a benzotriazole backbone from viewpoints of productivity when the UV-absorbing polymer as component (A) is produced and environmental problems. 2-[2-hydroxy-5-(2-methacryloyloxy-ethyl)phenyl]-2H-benzotriazole, 2-[2-hydroxy-5-(2-(acryloyloxy)-ethyl)phenyl]-2H-benzotriazole, 2-(2-hydroxy-5-methacryloyloxy-phenyl)-2H-benzotriazole, and 2-(2-hydroxy-5-acryloyloxy-phenyl)-2H-benzotriazole are more preferable.

As the (meth)acrylate as component (a1), these can be used singly or as a mixture of two or more thereof.

The content of the structural unit derived from the (meth)acrylate as component (a1) in the UV-absorbing polymer as component (A) may be usually 10 mol % or more, preferably 20 mol % or more, more preferably 25 mol % or more, and still more preferably 30 mol % or more from a viewpoint of the weather resistance of a hard coat laminated film to be formed with the sum of the structural unit derived from component (a1), the structural unit derived from component (a2), and the structural unit derived from component (a3) as 100 mol %. Meanwhile, the content of the structural unit derived from the (meth)acrylate as component (a1) may be usually 60 mol % or less, preferably 50 mol % or less, more preferably 45 mol % or less, and still more preferably 40 mol % or less from a viewpoint of productivity when the UV-absorbing polymer as component (A) is produced. In one embodiment, the content of the structural unit derived from the (meth)acrylate as component (a1) may be usually 10 mol % or more and 60 mol % or less, preferably 10 mol % or more and 50 mol % or less, 10 mol % or more and 45 mol % or less, 10 mol % or more and 40 mol % or less, 20 mol % or more and 60 mol % or less, 20 mol % or more and 50 mol % or less, 20 mol % or more and 45 mol % or less, 20 mol % or more and 40 mol % or less, 25 mol % or more and 60 mol % or less, 25 mol % or more and 50 mol % or less, 25 mol % or more and 45 mol % or less, 25 mol % or more and 40 mol % or less, 30 mol % or more and 60 mol % or less, 30 mol % or more and 50 mol % or less, 30 mol % or more and 45 mol % or less, or 30 mol % or more and 40 mol % or less.

(a2) Alkyl(meth)acrylate

Component (a2) is an alkyl (meth)acrylate, and is an ester of an aliphatic alkyl monoalcohol that may have a branched alkyl group, a cyclic hydrocarbon group, or an ether group, and (meth)acrylic acid. The number of carbon atoms in the aliphatic alkyl monoalcohol may be usually 20 or less, preferably 12 or less, more preferably 6 or less, still more preferably 1 to 2, and most preferably 1. The alkyl (meth)acrylate as component (a2) functions to enhance the compatibility between the UV-absorbing polymer as component (A) and the polyfunctional (meth)acrylate as component (B).

Examples of the alkyl (meth)acrylate as component (a2) include methyl (meth)acrylate, ethyl (meth)acrylate, propyl (meth)acrylate, butyl (meth)acrylate, hexyl (meth)acrylate, and octyl (meth)acrylate. Among these, from a viewpoint of the compatibility between the UV-absorbing polymer as component (A) and the polyfunctional (meth)acrylate as component (B), the alkyl (meth)acrylate as component (a2) is preferably methyl (meth)acrylate and ethyl (meth)acrylate, and more preferably methyl (meth)acrylate.

As the alkyl (meth)acrylate as component (a2), these can be used singly or as a mixture of two or more thereof.

The content of the structural unit derived from the alkyl (meth)acrylate as component (a2) in the UV-absorbing polymer as component (A) may be usually 10 mol % or more, preferably 20 mol % or more, more preferably 25 mol % or more, and still more preferably 30 mol % or more from a viewpoint of the compatibility between the UV-absorbing polymer as component (A) and the polyfunctional (meth)acrylate as component (B) with the sum of the structural unit derived from component (a1), the structural unit derived from component (a2), and the structural unit derived from component (a3) as 100 mol %. Meanwhile, the content of the structural unit derived from the alkyl (meth)acrylate as component (a2) may be usually 50 mol % or less, preferably 45 mol % or less, and more preferably 40 mol % or less from a viewpoint of the bending resistance of a hard coat laminated film to be formed. In one embodiment, the content of the structural unit derived from the alkyl (meth)acrylate as component (a2) may be usually 10 mol % or more and 50 mol % or less, preferably 10 mol % or more and 45 mol % or less, 10 mol % or more and 40 mol % or less, 20 mol % or more and 50 mol % or less, 20 mol % or more and 45 mol % or less, 20 mol % or more and 40 mol % or less, 25 mol % or more and 50 mol % or less, 25 mol % or more and 45 mol % or less, 25 mol % or more and 40 mol % or less, 30 mol % or more and 50 mol % or less, 30 mol % or more and 45 mol % or less, or 30 mol % or more and 40 mol % or less.

(a3) Compound Having One or More Isocyanate Groups Per Molecule

Component (a3) is a compound having one or more isocyanate groups (—N═C═O) per molecule. The isocyanate group-containing compound as component (a3) is preferably a compound having two or more isocyanate groups per molecule. The isocyanate group-containing compound as component (a3) is preferably a compound having two or more polymerizable functional groups per molecule, at least one of the polymerizable functional groups being an isocyanate group. The isocyanate group-containing compound as component (a3) and a hydroxyl group in the polyfunctional (meth)acrylate as component (B) can form a urethane bond when the active energy ray curable resin composition according to the various embodiments is cured, or the isocyanate group-containing compound as component (a3) and the hydroxyl group-containing (meth)acrylate (a4) can form a urethane bond when the hydroxyl group-containing (meth)acrylate (a4) is further used in production of the UV-absorbing polymer as component (A) as described later, by which the isocyanate group-containing compound can function to enhance the bending resistance of a hard coat laminated film to be formed.

Examples of the isocyanate group-containing compound as component (a3) include compounds having two isocyanate groups per molecule such as diphenylmethane diisocyanate, hexamethylene diisocyanate, isophorone diisocyanate, tolylene diisocyanate, and methylenebis(4-cyclohexyl isocyanate); polyisocyanates such as trimethylolpropane adducts of hexamethylene diisocyanate, trimethylolpropane adducts of isophorone diisocyanate, trimethylolpropane adducts of tolylene diisocyanate, isocyanurates of hexamethylene diisocyanate, isocyanurates of isophorone diisocyanate, isocyanurates of tolylene diisocyanate, and biurets of hexamethylene diisocyanate; and urethane crosslinking agents such as blocked isocyanates of the polyisocyanates.

Examples of the polymerizable functional groups other than the isocyanate group contained in the isocyanate group-containing compound as component (a3) include a (meth) acryloyl group, a vinyl group, an epoxy group, an amino group, and a mercapto group. Among these, a (meth)acryloyl group and a vinyl group are preferable. When the isocyanate group-containing compound has an alkyl group in addition to the (meth)acryloyl group, the compound is classified not into component (a2) but into component (a3).

Examples of the isocyanate group-containing compound as component (a3) include a compound having two or more polymerizable functional groups per molecule with at least one of the polymerizable functional groups being an isocyanate group, for example, 2-isocyanatoethyl (meth)acrylate and 1,1-(bis(meth)acryloyloxymethyl)ethyl isocyanate.

As the isocyanate group-containing compound as component (a3), these can be used singly or as a mixture of two or more thereof. In one embodiment, a mixture of a compound having no polymerizable functional group other than the isocyanate group and a compound having other polymerizable functional group in addition to the isocyanate group may be used as the isocyanate group-containing compound as component (a3).

The content of the structural unit derived from the isocyanate group-containing compound as component (a3) in the UV-absorbing polymer as component (A) may be usually 10 mol % or more, preferably 20 mol % or more, and more preferably 25 mol % or more from a viewpoint of the bending resistance of a hard coat laminated film to be formed with the sum of the structural unit derived from component (a1), the structural unit derived from component (a2), and the structural unit derived from component (a3) as 100 mol %. Meanwhile, the content of the structural unit derived from the isocyanate group-containing compound as component (a3) may be usually 70 mol % or less, preferably 60 mol % or less, more preferably 55 mol % or less, and still more preferably 50 mol % or less from a viewpoint of the abrasion resistance of a hard coat laminated film to be formed. In one embodiment, the content of the structural unit derived from the isocyanate group-containing compound as component (a3) may be usually 10 mol % or more and 70 mol % or less, preferably 10 mol % or more and 60 mol % or less, 10 mol % or more and 55 mol % or less, 10 mol % or more and 50 mol % or less, 20 mol % or more and 70 mol % or less, 20 mol % or more and 60 mol % or less, 20 mol % or more and 55 mol % or less, 20 mol % or more and 50 mol % or less, 25 mol % or more and 70 mol % or less, 25 mol % or more and 60 mol % or less, 25 mol % or more and 55 mol % or less, or 25 mol % or more and 50 mol % or less.

(a4) Hydroxyl Group-Containing (meth)acrylate

It is preferable that the UV-absorbing polymer as component (A) is further comprised of a structural unit derived from a hydroxyl group-containing (meth)acrylate (a4). The hydroxyl group-containing (meth)acrylate as component (a4) is a (meth)acrylate having one or more hydroxyl groups per molecule. The hydroxyl group-containing (meth)acrylate as component (a4) may be preferably a (meth)acrylate having one or more hydroxyl groups per molecule and one (meth)acryloyl group. The hydroxyl group-containing (meth)acrylate as component (a4) and the isocyanate group-containing compound as component (a3) can form a urethane bond when the UV-absorbing polymer as component (A) is produced, or the hydroxyl group-containing (meth)acrylate as component (a4) and the isocyanate group in the UV-absorbing polymer as component (A) can form a urethane bond when the active energy ray curable resin composition according to various embodiments is cured, by which the hydroxyl group-containing (meth)acrylate can function to enhance the bending resistance of a hard coat to be formed.

Examples of the hydroxyl group-containing (meth)acrylate as component (a4) include 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, 4-hydroxybutyl (meth)acrylate, and caprolactone (meth)acrylate (a compound having a structure of the following formula (4)). As component (a4), these can be used singly or as a mixture of two or more thereof.

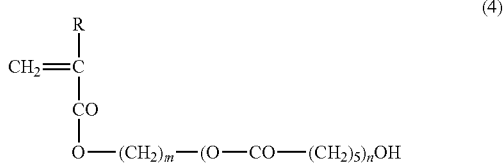

(4)

In the formula, R is —H or —CH$_3$; m is a natural number of 1 or more, typically from 2 to 4; n is a natural number of 1 or more, typically from 1 to 6.

The relationship (ratio) between the number of the isocyanate groups derived from each monomer and the number of the hydroxyl groups derived from each monomer when the UV-absorbing polymer as component (A) is produced is as follows: the number of the hydroxyl groups may be usually 50 to 250, preferably 80 to 200, more preferably 100 to 180, and still more preferably 110 to 160 with the number of the isocyanate groups being 100. From a viewpoint of the stability of the characteristics of component (A) when the UV-absorbing polymer as component (A) is produced, it is preferable that all the isocyanate groups derived from the isocyanate group-containing compound as component (a3) are caused to react with the hydroxyl groups derived from the hydroxyl group-containing (meth)acrylate as component (a4) to form a urethane bond. The content of the structural unit derived from the hydroxyl group-containing (meth) acrylate as component (a4) in component (A) is determined in consideration of the above-mentioned viewpoints.

The content of the structural unit derived from the hydroxyl group-containing (meth)acrylate as component (a4) in the UV-absorbing polymer as component (A) may be usually 10-50 mol %, preferably 16-40 mol %, more preferably 20-36 mol %, and still more preferably 22-32 mol %, for example, when component (a3) is hexamethylene diisocyanate (having two isocyanate groups per molecule), the content thereof being 10 mol %, and component (a4) is 2-hydroxyethyl acrylate (having one hydroxyl group per molecule). Here, the sum of the structural unit derived from component (a1), the structural unit derived from component (a2), and the structural unit derived from component (a3) is 100 mol %.

The UV-absorbing polymer as component (A) may be comprised of a structural unit derived from other polymerizable monomer that can be copolymerized with at least any one of components (a1) to (a4) in addition to the structural units derived from components (a1) to (a4). The other polymerizable monomer is usually a compound having a carbon-carbon double bond, and typically a compound having an ethylenic double bond such as styrene, acrylic acid, methacrylic acid, ethylene, propylene, and a polyfunctional (meth)acrylate.

Figure 2:
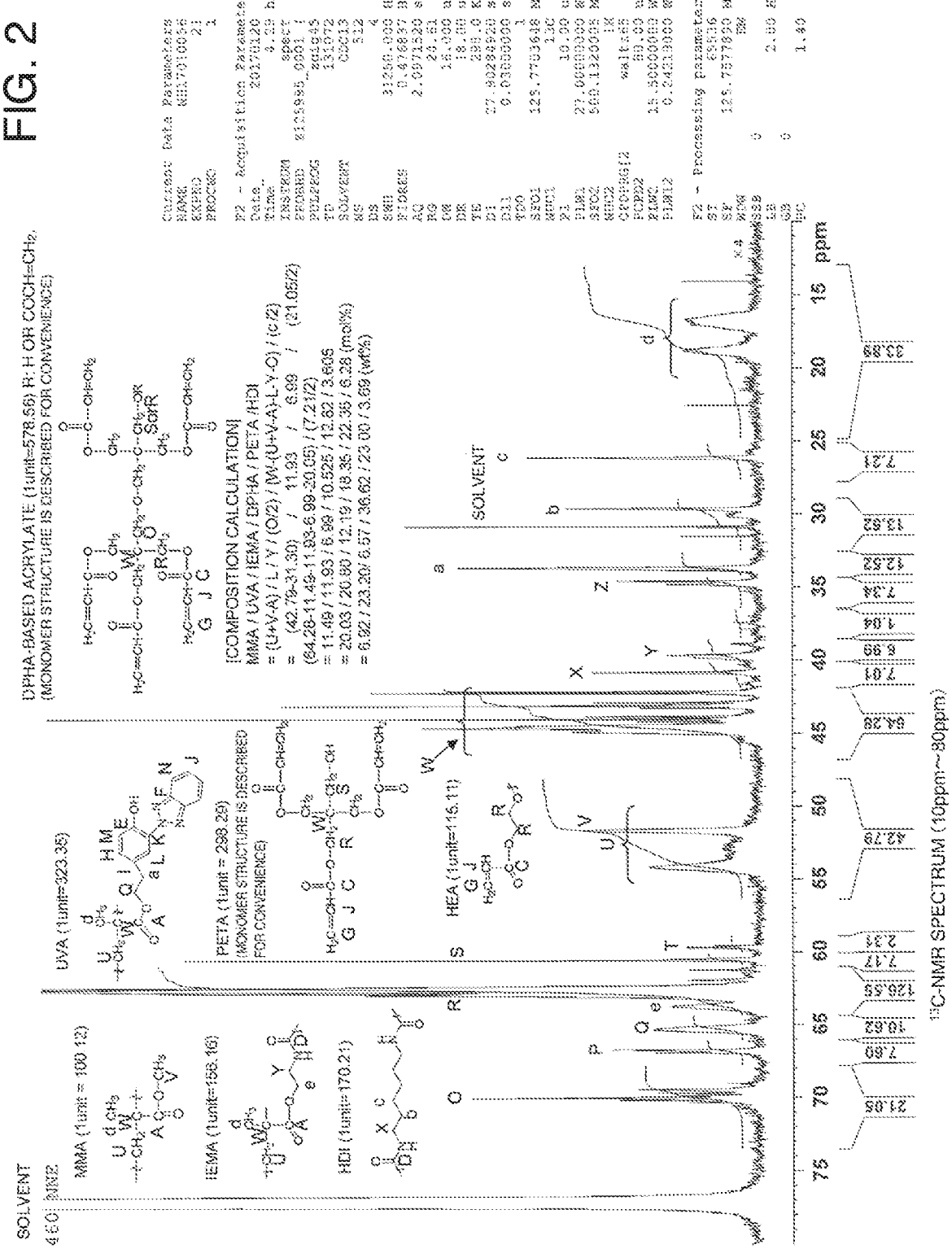
FIG. 2 is an enlarged view of a range of 10-80 ppm of the $^{13}$C-NMR spectrum of FIG. 1.
Figure 3:
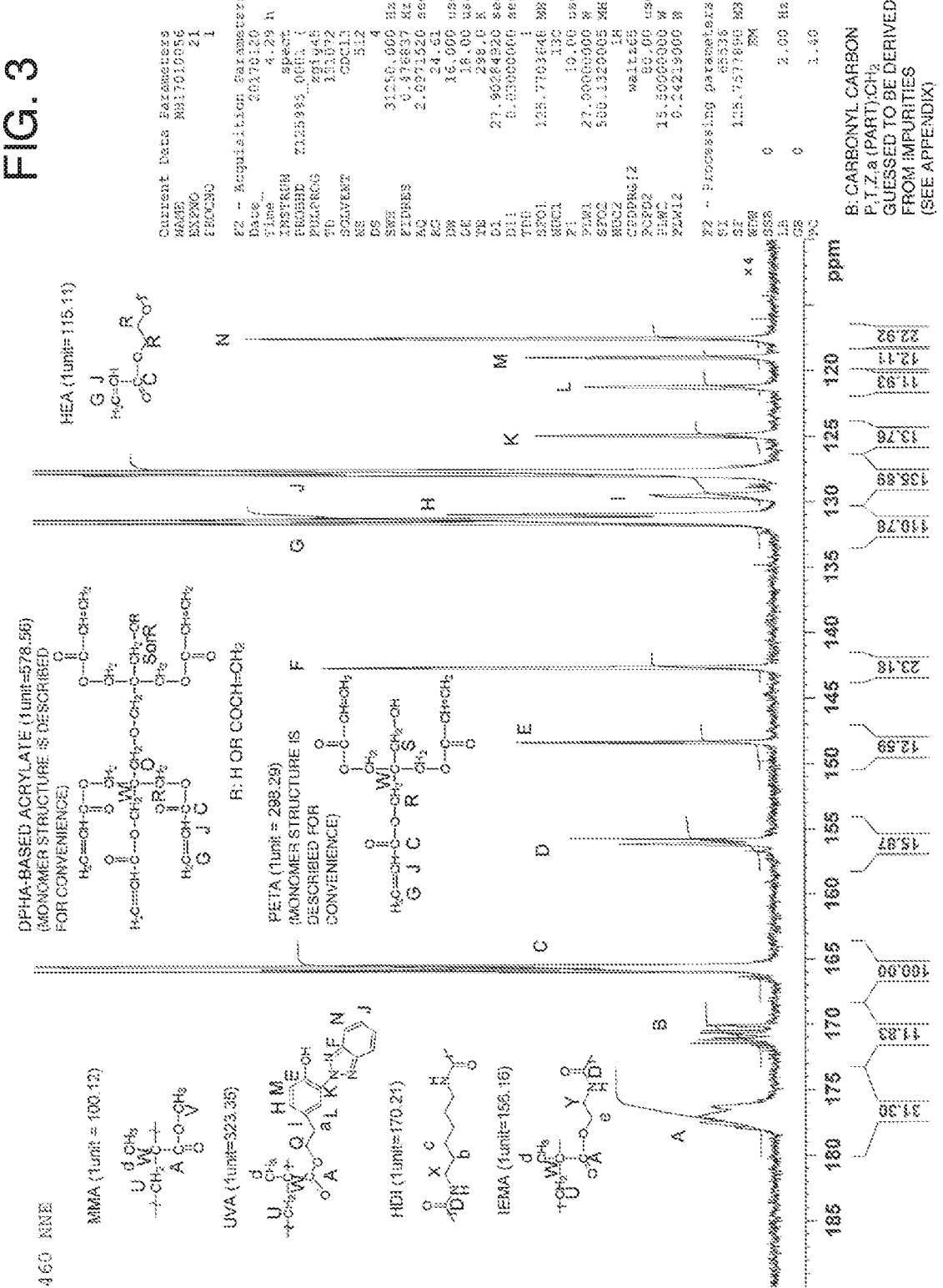
FIG. 3 is an enlarged view of a range of 110-190 ppm of the $^{13}$C-NMR spectrum of FIG. 1.

The content of each of the structural units derived from components (a1) to (a4) in the UV-absorbing polymer as component (A) can be determined using $^{13}$C-NMR. The $^{13}$C-NMR spectrum can be measured, for example, by dissolving 120 mg of a sample in 0.6 mL of a chloroform-dl solvent, and using a 125 MHz nuclear magnetic resonance apparatus "AVANCE 3 cryo-500 type" (trade name) manufactured by Bruker BioSpin GmbH under the following conditions. FIGS. 1 to 3 illustrate an example of measurement of the $^{13}$C-NMR spectrum of an active energy ray curable resin composition obtained by mixing and stirring predetermined amounts of components (A-1), (B-1), and (B-2) in Examples described later.

Chemical shift reference: automatic setting by apparatus
Measurement mode: single pulse inverse-gated decoupling
Pulse width: 45° (5.0 μs)
Number of points: 64K
Measurement range: 250 ppm (−25-225 ppm)
Repeat time: 30.0 seconds
Number of integrations: 512 times
Measurement temperature: 25° C.
Window function: exponential (BF: 2.00 Hz)

Peak attribution can be performed with reference to "Polymer Analysis Handbook (First edition, vol. 1, Sep. 20, 2008, Edited by the Polymer Analytical Council of Japan Analytical Chemistry, Asakura Shoten Co., Ltd.)" or "NMR database of Materials Information Station (National Institute for Materials Science, http://polymer.nims.go.jp/NMR/)", and the ratio of each structural unit in the UV-absorbing polymer as component (A) can be calculated from the peak area ratio. The measurement of $^{13}$C-NMR can also be performed at an analytical institution such as Mitsui Chemical Analysis & Consulting Service, Inc.

A method for producing the UV-absorbing polymer as component (A) is not particularly limited, and any known method for producing an acrylic polymer can be used. When the UV-absorbing polymer as component (A) is produced, any known catalyst may be added as required.

The UV-absorbing polymer as component (A) may be a mixture containing two or more UV-absorbing polymers. When the UV-absorbing polymer is a mixture, the contents of the structural units derived from components (a1) to (a3) as the mixture may be within the above-mentioned ranges. Preferably, the contents of the structural units derived from components (a1) to (a3) of each polymer forming the mixture may be within the above-mentioned ranges.

(B) Polyfunctional (meth)acrylate

A polyfunctional (meth)acrylate that is a (meth)acrylate having two or more (meth)acryloyl groups per molecule as component (B) may be cured by active energy rays such as ultraviolet rays and electron beams, by which the polyfunctional (meth)acrylate can function to form a hard coat.

Examples of the polyfunctional (meth)acrylate as component (B) include (meth)acryloyl group-containing bifunctional reactive monomers such as diethylene glycol di(meth)acrylate, neopentyl glycol di(meth)acrylate, 1,6-hexanediol di(meth)acrylate, polyethylene glycol di(meth)acrylate, 2,2'-bis(4-(meth)acryloyloxypolyethyleneoxyphenyl)propane, and 2,2'-bis(4-(meth)acryloyloxypolypropyleneoxyphenyl)propane; (meth)acryloyl group-containing trifunctional reactive monomers such as trimethylolpropane tri(meth)acrylate, trimethylolethane tri(meth)acrylate, and pentaerythritol tri(meth)acrylate; (meth)acryloyl group-containing tetrafunctional reactive monomers such as pentaerythritol tetra(meth)acrylate; (meth)acryloyl group-containing hexafunctional reactive monomers such as dipentaerythritol hexaacrylate; (meth)acryloyl group-containing octafunctional reactive monomers such as tripentaerythritol octaacrylate; and polymers (oligomers and prepolymers) comprised of one or more thereof as constituent monomers. From a viewpoint of the abrasion resistance of a hard coat laminated film to be formed, the polyfunctional (meth)acrylate as component (B) is preferably a (meth)acrylate having three or more (meth)acryloyl groups per molecule. As the polyfunctional (meth)acrylate as component (B), these can be used singly or as a mixture of two or more thereof.

The blending amount of the polyfunctional (meth)acrylate as component (B) may be usually 20 parts by mass or more, preferably 40 parts by mass or more, more preferably 60 parts by mass or more, still more preferably 80 parts by mass or more, and most preferably 100 parts by mass or more from a viewpoint of the abrasion resistance of a hard coat laminated film to be formed with the blending amount of the UV-absorbing polymer as component (A) being 100 parts by mass. Meanwhile, the blending amount of the polyfunctional (meth)acrylate as component (B) may be usually 600 parts by mass or less, preferably 400 parts by mass or less, more preferably 300 parts by mass or less, still more preferably 200 parts by mass or less, and most preferably 150 parts by mass or less from a viewpoint of the weather resistance of a hard coat laminated film to be formed. In one embodiment, the blending amount of the polyfunctional (meth)acrylate as component (B) may be usually 20 parts by mass or more and 600 parts by mass or less, preferably 20 parts by mass or more and 400 parts by mass or less, 20 parts by mass or more and 300 parts by mass or less, 20 parts by mass or more and 200 parts by mass or less, 20 parts by mass or more and 150 parts by mass or less, 40 parts by mass or more and 600 parts by mass or less, 40 parts by mass or more and 400 parts by mass or less, 40 parts by mass or more and 300 parts by mass, 40 parts by mass or more and 200 parts by mass or less, 40 parts by mass or more and 150 parts by mass or less, 60 parts by mass or more and 600 parts by mass or less, 60 parts by mass or more and 400 parts by mass or less, 60 parts by mass or more and 300 parts by mass or less, 60 parts by mass or more and 200 parts by mass or less, 60 parts by mass or more and 150 parts by mass or less, 80 parts by mass or more and 600 parts by mass or less, 80 parts by mass or more and 400 parts by mass or less, 80 parts by mass or more and 300 parts by mass or less, 80 parts by mass or more and 200 parts by mass or less, 80 parts by mass or more and 150 parts by mass or less, 100 parts by mass or more and 600 parts by mass or less, 100 parts by mass or more and 400 parts by mass or less, 100 parts by mass or more and 300 parts by mass or less, 100 parts by mass or more and 200 parts by mass or less, or 100 parts by mass or more and 150 parts by mass or less.

It is preferable that the active energy ray curable resin composition according to the various embodiments further contains a compound having two or more isocyanate groups per molecule and/or a photopolymerization initiator from a viewpoint of improving the curability of the active energy ray-curable resin composition by active energy rays.

Examples of the compound having two or more isocyanate groups per molecule include compounds having two isocyanate groups per molecule such as hexamethylene diisocyanate, isophorone diisocyanate, tolylene diisocyanate, and methylenebis(4-cyclohexyl isocyanate); polyisocyanates such as trimethylolpropane adducts of hexamethylene diisocyanate, trimethylolpropane adducts of isophorone diisocyanate, trimethylolpropane adducts of tolylene diisocyanate, isocyanurates of hexamethylene diisocyanate, isocyanurates of isophorone diisocyanate, isocyanurates of tolylene diisocyanate, and biurets of hexamethylene diisocyanate; and urethane crosslinking agents such as blocked isocyanates of the polyisocyanates. As the compound having two or more isocyanate groups per molecule, these can be used singly or as a mixture of two or more thereof. When crosslinking is carried out, as required, there may be added a catalyst such as dibutyltin dilaurate or dibutyltin diethyl hexoate.

Examples of the photopolymerization initiator include benzophenone compounds such as benzophenone, methyl-o-benzoyl benzoate, 4-methylbenzophenone, 4,4'-bis(diethylamino)benzophenone, methyl o-benzoylbenzoate, 4-phenylbenzophenone, 4-benzoyl-4'-methyldiphenyl sulfide, 3,3',4,4'-tetra(tert-butylperoxycarbonyebenzophenone, and 2,4,6-trimethylbenzophenone; benzoin compounds such as benzoin, benzoin methyl ether, benzoin ethyl ether, benzoin isopropyl ether, and benzyl methyl ketal; acetophenone compounds such as acetophenone, 2,2-dimethoxy-2-phenylacetophenone, and 1-hydroxycyclohexyl phenyl ketone; anthraquinone compounds such as methylanthraquinone, 2-ethylanthraquinone, and 2-amylanthraquinone; thioxanthone compounds such as thioxanthone, 2,4-diethylthioxanthone, and 2,4-diisopropylthioxanthone; alkylphenone compounds such as acetophenone dimethyl ketal; triazine compounds; biimidazole compounds; acylphosphine oxide compounds; titanocene compounds; oxime ester compounds; oxime phenylacetate ester compounds; hydroxyketone compounds; thiophenyl compounds such as 2-methyl-1-(4-methylthiophenyl)-2-morpholinopropan-1-one; and aminobenzoate compounds. Among these, acetophenone compounds are preferable. As the photopolymerization initiator, these can be used singly or as a mixture of two or more thereof.

The blending amount of the photopolymerization initiator may be usually 10 parts by mass or less, preferably 7 parts by mass or less, and more preferably 5 parts by mass or less from a viewpoint of preventing the yellowing and coloring of a hard coat to be formed with the sum of the blending amounts of components (A) and (B) being 100 parts by mass. Meanwhile, the blending amount of the photopolymerization initiator may be usually 0.1 part by mass or more, preferably 0.5 parts by mass or more, more preferably 1 part by mass or more, and still more preferably 2 parts by mass or more from a viewpoint of reliably obtaining the use effect of the photopolymerization initiator. In one embodiment, the blending amount of the photopolymerization initiator may be usually 0.1 part by mass or more and 10 parts by mass or less, preferably 0.1 part by mass or more and 7 parts by mass or less, 0.1 part by mass or more and 5 parts by mass or less, 0.5 parts by mass or more and 10 parts by mass or less, 0.5 parts by mass or more and 7 parts by mass or less, 0.5 parts by mass or more and 5 parts by mass or less, 1 part by mass or more and 10 parts by mass or less, 1 part by mass or more and 7 parts by mass or less, 1 part by mass or more and 5 parts by mass or less, 2 parts by mass or more and 10 parts by mass or less, 2 parts by mass or more and 7 parts by mass or less, or 2 parts by mass or more and 5 parts by mass or less.

The active energy ray curable resin composition according to the various embodiments may contain one or two or more additives such as an antioxidant, a weather resistance stabilizer, a light resistance stabilizer, an ultraviolet absorber, a thermal stabilizer, an antistatic agent, a surfactant, an infrared shielding agent, a leveling agent, a thixotropy imparting agent, an anti-fouling agent (or a stain-proofing agent), a printability improver, a colorant, inorganic particles, and organic particles, as required.

The active energy ray curable resin composition according to the various embodiments may be preferably free of inorganic particles from a viewpoint of the abrasion resistance of a hard coat laminated film to be formed. Without intending to be bound by theory, inorganic particles (for example, silica (silicon dioxide); metal oxide particles formed of aluminum oxide, zirconia, titania, zinc oxide, germanium oxide, indium oxide, tin oxide, indium tin oxide, antimony oxide, cerium oxide, and the like; metal fluoride particles formed of magnesium fluoride, sodium fluoride, and the like; metal sulfide particles; metal nitride particles; metal particles, and the like) are considered to have weak interaction with the resin components such as the UV-absorbing polymer as component (A) and the polyfunctional (meth)acrylate as component (B), which causes insufficient abrasion resistance. Here, "free of" (or, not containing) inorganic particles means not containing a significant amount of inorganic particles (hereinafter, the same applies). In the field of a hard coat-forming coating material, the significant amount of inorganic particles is usually about 1 part by mass or more with respect to 100 parts by mass of the sum of the blending amounts of components (A) and (B). Therefore, "free of" inorganic particles can be paraphrased as follows. That is, the amount of the inorganic particles is usually 0 part by mass or more and less than 1 part by mass, preferably 0.5 parts by mass or less, more preferably 0.1 part by mass or less, and still more preferably 0.01 part by mass or less with respect to 100 parts by mass of components (A) and (B).

The active energy ray curable resin composition according to the various embodiments may contain a solvent as required in order to dilute the resin composition to a concentration facilitating coating. The solvent is not particularly limited as long as it does not contribute to reacting with the UV-absorbing polymer as component (A), the polyfunctional (meth)acrylate as component (B), and other optional components or catalyzing (promoting) self-reactions (including deteriorative reactions) of these components. Examples of the solvent include 1-methoxy-2-propanol, ethyl acetate, n-butyl acetate, toluene, methyl ethyl ketone, methyl isobutyl ketone, diacetone alcohol, and acetone. As the solvent, these can be used singly or as a mixture of two or more thereof.

The active energy ray curable resin composition according to the various embodiments can be obtained by mixing and stirring these components.

2. Hard Coat Laminated Film

A hard coat laminated film according to the various embodiments is a hard coat laminated film including at least one layer of hard coat (hereinafter, sometimes referred to as a "first hard coat") formed by using the active energy ray curable resin composition according to the various embodiments. The hard coat laminated film according to the various embodiments usually includes a first hard coat and a resin film layer in order from a surface on a side upon which sunlight is incident in an actual state of use. Here, the actual state of use refers to a state where the hard coat laminated film is used as members of various articles.

2-1. First Hard Coat

The first hard coat-forming coating material, that is, the active energy ray curable resin composition according to the various embodiments has been described above. The method for forming the first hard coat using the active energy ray curable resin composition according to the various embodiments is not particularly limited, and any known web coating method can be used. Examples of the method include roll coating, gravure coating, reverse coating, roll brushing, dip coating, spray coating, spin coating, air knife coating, and die coating.

The thickness of the first hard coat is not particularly limited, and it may be usually 0.1 μm or more, preferably 0.5 μm or more, more preferably 1 μm or more, and still more preferably 1.5 μm or more from viewpoints of the weather resistance and abrasion resistance of a hard coat laminated film to be formed. Meanwhile, the thickness of the first hard coat may be usually 60 μm or less, preferably 30 μm or less, more preferably 20 μm or less, still more preferably 10 μm or less, and most preferably 5 μm or less from viewpoints of satisfactorily keeping the bending resistance of the hard coat laminated film according to the various embodiments, causing the hard coat laminated film to be easily handled as a film roll, and suppressing curling. In one embodiment, the thickness of the first hard coat may be usually 0.1 μm or more and 60 μm or less, preferably 0.1 μm or more and 30 μm or less, 0.1 μm or more and 20 μm or less, 0.1 μm or more and 10 μm or less, 0.1 μm or more and 5 μm or less, 0.5 μm or more and 60 μm or less, 0.5 μm or more and 30 μm or less, 0.5 μm or more and 20 μm or less, 0.5 μm or more and 10 μm or less, 0.5 μm or more and 5 μm or less, 1 μm or more and 60 μm or less, 1 μm or more and 30 μm or less, 1 μm or more and 20 μm or less, 1 μm or more and 10 μm or less, 1 μm or more and 5 μm or less, 1.5 μm or more and 60 μm or less, 1.5 μm or more and 30 μm or less, 1.5 μm or more and 20 μm or less, 1.5 μm or more and 10 μm or less, or 1.5 μm or more and 5 μm or less.

2-2. Resin Film Layer

The resin film layer is a layer composed of any resin film and serving as a film substrate for forming the first hard coat.

Examples of the resin film include resin films composed of polyvinyl chloride resins; polyester resins such as aromatic polyester and aliphatic polyester; polyolefin resins such as polyethylene, polypropylene, and polymethyl pentene; acrylic resins; polycarbonate resins; poly(meth) acrylimide resins; styrene-based resins such as polystyrene, an acrylonitrile-butadiene-styrene copolymer resin (ABS resin), a styrene-ethylene-butadiene-styrene copolymer, a styrene-ethylene-propylene-styrene copolymer, and a styrene-ethylene-ethylene-propylene-styrene copolymer; cellulose resins such as cellophane, triacetyl cellulose, diacetyl cellulose, and acetyl cellulose butyrate; polyvinylidene chloride resins; a fluorine-containing resin such as polyvinylidene fluoride; and polyvinyl alcohol, ethylene vinyl alcohol, polyether ether ketone, nylon, polyamide, polyimide, polyurethane, polyether imide, polysulfone, and polyethersulfone. These films include unstretched films, uniaxially oriented films, and biaxially oriented films. The resin film includes a laminated film obtained by laminating two or more of one or two or more types of these films.

When the hard coat laminated film according to the various embodiments is used in applications requiring transparency, for example, as a glass window film for exterior use for the purposes of protection, prevention of scattering, ultraviolet shielding, and infrared shielding and the like of window glass for building and a window of an automobile, etc.; and a hard coat laminated film for the purposes of protection, prevention of scattering, and the like of a display face plate in an image display device, particularly an image display device used in places receiving direct sunlight such as car navigation or digital signage, the resin film preferably has high transparency. A transparent resin film having high transparency and no coloring is more preferable.

The transparent resin film may have a total light transmittance of usually 80% or higher, preferably 85% or higher, more preferably 88% or higher, and still more preferably 90% or higher (as measured according to JIS K7361-1:1997 using a turbidimeter "NDH2000" (trade name) manufactured by Nippon Denshoku Industries Co., Ltd. A higher total light transmittance is preferable.

The transparent resin film may have a yellowness index of usually 5 or lower, preferably 3 or lower, more preferably 2 or lower, and still more preferably 1 or lower (as measured according to JIS K7105:1981 using a chromaticity meter "SolidSpec-3700" (trade name) manufactured by Shimadzu Corporation). A lower yellowness index is preferable.

Examples of the transparent resin film include films composed of cellulose ester resins such as triacetylcellulose; polyester resins such as polyethylene terephthalate; cyclic hydrocarbon resins such as ethylene norbornene copolymers; acrylic resins such as polymethyl methacrylate, polyethyl methacrylate, and vinylcyclohexane-methyl (meth) acrylate copolymer; aromatic polycarbonate resins; polyolefin resins such as polypropylene and 4-methyl-pentene-1; polyamide resins; polyarylate resins; polymer-type urethane acrylate resins; and polyimide resins. These films include unstretched films, uniaxially oriented films, and biaxially oriented films. The transparent resin film further includes a laminated film obtained by laminating two or more of one or two or more types of these films.

When the hard coat laminated film according to the various embodiments is used for applications not requiring transparency, for example, a decorative sheet, a decorative film, and the like, the resin film may be colored, opaque, or transparent.

The thickness of the resin film is not particularly limited, and can be set to any thickness as required. When the hard coat laminated film according to the various embodiments is used for applications not requiring high rigidity, the thickness of the resin film may be usually 10 μm or more, preferably 30 μm or more, and more preferably 50 μm or more from a viewpoint of handleability and further from a viewpoint of conforming to the standard as a glass shatterproof film. Meanwhile, from a viewpoint of economic efficiency, the thickness of the resin film may be usually 250 μm or less, preferably 150 μm or less, and more preferably 100 μm or less. When the hard coat laminated film according to the various embodiments is used for applications requiring high rigidity, the thickness of the resin film may be usually 200 μm or more, preferably 300 μm or more, and more preferably 400 μm or more. From a viewpoint of meeting the demand for reducing the thickness of the article, the thickness of the resin film may be usually 1500 μm or less, preferably 1000 μm or less, and more preferably 700 μm or less.

2-3. Anchor Coat

The hard coat laminated film according to the various embodiments preferably includes a first hard coat (i.e. a hard coat formed by using the active energy ray curable resin composition according to the various embodiments), an anchor coat, and a resin film layer in order from a surface on a side upon which sunlight is incident in an actual state of use. In this embodiment, preferably, the active energy ray curable resin composition for forming the first hard coat does not contain a significant amount of inorganic particles (the meaning of "significant amount" herein has been as described above).

An anchor coat agent for forming the anchor coat is not particularly limited, and any anchor coat agent can be used. Examples of the anchor coat agent include polyester-based, acrylic-based, polyurethane-based, acrylic urethane-based, and polyester urethane-based anchor coat agents. As the anchor coat agent, these can be used singly or as a mixture of two or more thereof.

The anchor coat agent preferably contains (P) a polymer (resin or oligomer) comprised of a structural unit derived from a (meth)acrylate having one or more of one or more types of backbones selected from the group consisting of a benzotriazole backbone, a triazine backbone, and a benzophenone backbone per molecule. More preferably, the anchor coat agent contains the polymer as component (P) in a major amount (usually 50% by mass or more of solid content, preferably 70% by mass or more, more preferably 80% by mass or more, and still more preferably 90% by mass or more). In one embodiment, preferably, the anchor coat agent may substantially contain 100% by mass of the polymer as component (P). By using such an anchor coat agent, the weather resistance of a hard coat laminate to be formed can be further enhanced.

(P) Polymer Comprised of Structural Unit Derived from (meth)acrylate Having One or More of One or More Types of Backbones Selected from the Group Consisting of Benzotriazole Backbone, Triazine Backbone, and Benzophenone Backbone Per Molecule Component (P) is a polymer (resin or oligomer) having a function of absorbing ultraviolet rays. The polymer as component (P) has a function of absorbing ultraviolet rays, and functions to enhance the weather resistance of a hard coat laminate to be formed. The polymer as component (P) is cured by heat or active energy rays to function to form an anchor coat.

The polymer as component (P) is comprised of (p1) a structural unit derived from a (meth)acrylate having one or more of one or more types of backbones selected from the group consisting of a benzotriazole backbone, a triazine backbone, and a benzophenone backbone per molecule.

Examples of the polymer as component (P) include a polymer comprised of (p1) a structural unit derived from a (meth)acrylate having one or more of one or more types of backbones selected from the group consisting of a benzotriazole backbone, a triazine backbone, and a benzophenone backbone per molecule; (p2) a structural unit derived from an alkyl (meth)acrylate; and (p3) a structural unit derived from a hydroxyl group-containing (meth)acrylate.

As the (meth)acrylate as component (p1), the same compounds as those described for component (a1) can be used. The (meth)acrylate as component (p1) functions to enhance the weather resistance of a hard coat laminated film to be formed. Specific examples of the (meth)acrylate as component (p1) are as described above regarding component (a1). Among these, the (meth)acrylate as component (p1) is preferably a (meth)acrylate having a benzotriazole backbone from viewpoints of productivity when the polymer as component (P) is produced and environmental problems. 2-[2-hydroxy-5-(2-methacryloyloxy-ethyl)phenyl]-2H-benzotriazole, 2-[2-hydroxy-5-(2-(acryloyloxy)-ethyl)phenyl]-2H-benzotriazole, 2-(2-hydroxy-5-methacryloyloxy-phenyl)-2H-benzotriazole, and 2-(2-hydroxy-5-acryloyloxy-phenyl)-2H-benzotriazole are more preferable. As the (meth)acrylate as component (p1), these can be used singly or as a mixture of two or more thereof.

The content of the structural unit derived from the (meth)acrylate as component (p1) in the polymer as component (P) may be usually 1 mol % or more, preferably 3 mol % or more, more preferably 7 mol or more, and still more preferably 10 mol % or more from a viewpoint of the weather resistance of a hard coat laminate to be formed with the sum of structural units derived from all constituent monomers as 100 mol %. Meanwhile, the content of the structural unit derived from the (meth)acrylate as component (p1) may be usually 50 mol % or less, preferably 40 mol % or less, more preferably 30 mol % or less, and still more preferably 20 mol % or less from viewpoints of adhesiveness and curability. In one embodiment, the content of the structural unit derived from the (meth)acrylate as component (p1) may be usually 1 mol % or more and 50 mol % or less, preferably 1 mol % or more and 40 mol % or less, 1 mol % or more and 30 mol % or less or less, 1 mol % or more and 20 mol % or less, 3 mol % or more and 50 mol % or less, 3 mol % or more and 40 mol % or less, 3 mol % or more and 30 mol % or less, 3 mol % or more and 20 mol % or less, 7 mol % or more and 50 mol % or less, 7 mol % or more and 40 mol % or less, 7 mol % or more and 30 mol % or less, 7 mol % or more and 20 mol % or less, 10 mol % or more and 50 mol % or less, 10 mol % or more and 40 mol % or less, 10 mol % or more and 30 mol % or less, or 10 mol % or more and 20 mol % or less.

As the alkyl (meth)acrylate as component (p2), the same compounds as those described for component (a2) can be used. The alkyl (meth)acrylate as component (p2) functions to enhance the adhesiveness between the anchor coat and the first hard coat. Specific examples of the alkyl (meth)acrylate as component (p2) are as described above regarding component (a2). Among these, the alkyl (meth)acrylate as component (p2) is preferably methyl (meth)acrylate and ethyl (meth)acrylate, and more preferably methyl (meth)acrylate from a viewpoint of adhesiveness. As the alkyl (meth)acrylate as component (p2), these can be used singly or as a mixture of two or more thereof.

The content of the structural unit derived from the alkyl (meth)acrylate as component (p2) in the polymer as component (P) may be usually 30 mol % or more, preferably 50 mol % or more, more preferably 60 mol or more, and still more preferably 65 mol % or more from a viewpoint of adhesiveness with the sum of structural units derived from all constituent monomers as 100 mol %. Meanwhile, the content of the structural unit derived from the alkyl (meth) acrylate as component (p2) may be usually 95 mol % or less, preferably 90 mol % or less, more preferably 85 mol % or less, and still more preferably 80 mol % or less from viewpoints of the weather resistance and curability of a hard coat laminated film to be formed. In one embodiment, the content of the structural unit derived from the alkyl (meth) acrylate as component (p2) may be usually 30 mol % or more and 95 mol % or less, preferably 30 mol % or more and 90 mol % or less, 30 mol % or more and 85 mol % or less, 30 mol % or more and 80 mol % or less, 50 mol % or more and 95 mol % or less, 50 mol % or more and 90 mol % or less, 50 mol % or more and 85 mol % or less, 50 mol % or more and 80 mol % or less, 60 mol % or more and 95 mol % or less, 60 mol % or more and 90 mol % or less, 60 mol % or more and 85 mol % or less, 60 mol % or more and 80 mol % or less, 65 mol % or more and 95 mol % or less, 65 mol % or more and 90 mol % or less, 65 mol % or more and 85 mol % or less, or 65 mol % or more and 80 mol % or less.

As the hydroxyl group-containing (meth)acrylate as component (p3), the same compounds as those described for component (a4) can be used. The hydroxyl group-containing (meth)acrylate as component (p3) functions to enhance the curability of the polymer of component (P). Specific examples of the hydroxyl group-containing (meth)acrylate as component (p3) are as described above regarding component (a4). As the hydroxyl-containing (meth)acrylate as component (p3), these can be used singly or as a mixture of two or more thereof.

The content of the structural unit derived from the hydroxyl group-containing (meth)acrylate as component (p3) in the polymer as component (P) may be usually 1 mol % or more, preferably 4 mol % or more, more preferably 6 mol % or more, and still more preferably 8 mol % or more from a viewpoint of curability with the sum of structural units derived from all constituent monomers as 100 mol %. Meanwhile, the content of the structural unit derived from the hydroxyl group-containing (meth)acrylate as component (p3) may be usually 50 mol % or less, preferably 30 mol % or less, more preferably 20 mol % or less, and still more preferably 15 mol % or less from viewpoints of the weather resistance and adhesiveness of a hard coat laminated film to be formed. In one embodiment, the content of the structural unit derived from the hydroxyl group-containing (meth)acrylate as component (p3) may be usually 1 mol % or more and 50 mol % or less, preferably 1 mol % or more and 30 mol % or less, 1 mol % or more and 20 mol % or less, 1 mol % or more and 15 mol % or less, 4 mol % or more and 50 mol % or less, 4 mol % or more and 30 mol % or less, 4 mol % or more and 20 mol % or less, 4 mol % or more and 15 mol % or less, 6 mol % or more and 50 mol % or less, 6 mol % or more and 30 mol % or less, 6 mol % or more and 20 mol % or less, 6 mol % or more and 15 mol % or less, 8 mol % or more and 50 mol % or less, 8 mol % or more and 30 mol % or less, 8 mol % or more and 20 mol % or less, or 8 mol % or more and 15 mol % or less.

The polymer as component (P) may be comprised of a structural unit derived from other polymerizable monomer that can be copolymerized with at least any one of components (p1) to (p3) in addition to the structural units derived from components (p1) to (p3). The other polymerizable monomer is usually a compound having a carbon-carbon double bond, and typically a compound having an ethylenic double bond such as styrene, acrylic acid, methacrylic acid, ethylene, propylene, and a polyfunctional (meth)acrylate.

Figure 4:
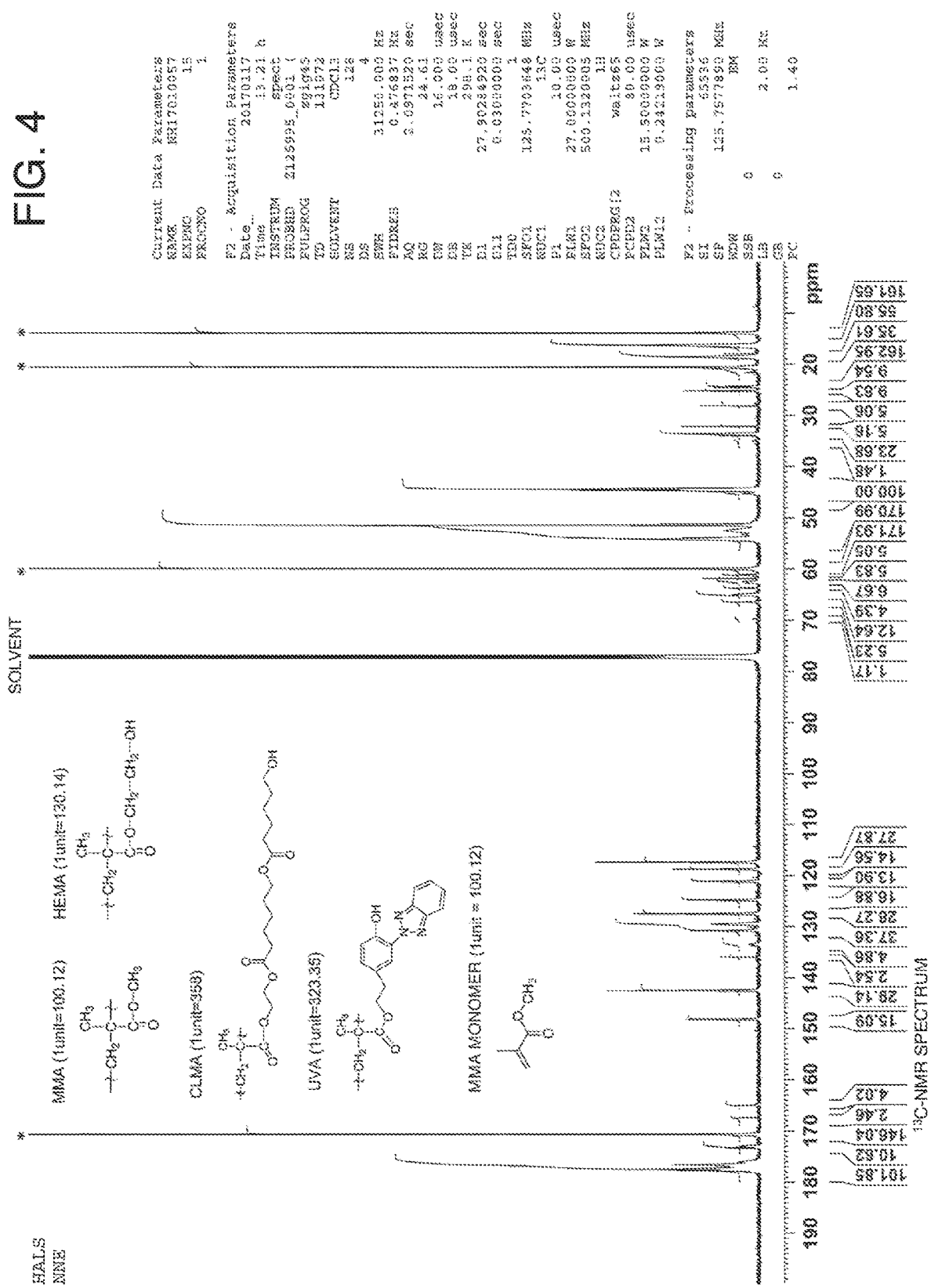
FIG. 4 is a $^{13}$C-NMR spectrum of an anchor coat polymer (P-1) used in Examples.

The content of each of the structural units derived from components (p1) to (p3) in the polymer as component (P) can be determined using $^{13}$C-NMR. The measuring method is as described above with respect to the content of each of the structural units derived from components (a1) to (a4) in the UV-absorbing polymer as component (A). An example of measurement of the $^{13}$C-NMR spectrum of the anchor coat polymer (P-1) in Examples described later is shown in FIG. 4.

The method for producing the polymer as component (P) is not particularly limited, and any known method for producing an acrylic polymer can be used. When component (P) is produced, any known catalyst may be added as required.

The polymer as component (P) may be a mixture containing two or more UV-absorbing polymers. When the polymer is a mixture, the contents of the structural units derived from components (p1) to (p3) as the mixture may be within the above-mentioned ranges. Preferably, the contents of the structural units derived from components (p1) to (p3) of each polymer constituting the mixture may be within the above-mentioned ranges.

It is preferable that the anchor coat agent further contains a compound having two or more isocyanate groups per molecule and/or a photopolymerization initiator from a viewpoint of improving the curability by heat or active energy rays.

As the compound having two or more isocyanate groups per molecule, the same compounds as those described above in the description of the active energy ray curable resin composition according to the various embodiments can be used. As the compound having two or more isocyanate groups per molecule, these can be used singly or as a mixture of two or more thereof.

When a compound having two or more isocyanate groups per molecule is used, the blending amount thereof may preferably be determined such that the number of the isocyanate groups is usually 40-200, preferably 50-125, more preferably 56-100, and still more preferably 63-91 with the number of the hydroxyl groups in the anchor coat agent as 100.

When the compound having two or more isocyanate groups per molecule is used, the blending amount thereof may be usually 1-50 parts by mass, preferably 3-25 parts by mass, and more preferably 5-15 parts by mass with respect to 100 parts by mass of the polymer as component (P).

As the photopolymerization initiator, the same compounds as those described above in the description of the active energy ray curable resin composition according to the various embodiments can be used. As the photopolymerization initiator, these can be used singly or as a mixture of two or more thereof.

The anchor coat agent may contain one or two or more additives such as an antioxidant, a weather resistance stabilizer, a light resistance stabilizer, an ultraviolet absorber, a thermal stabilizer, an antistatic agent, a surfactant, an infrared shielding agent, a leveling agent, a thixotropy imparting agent, an anti-fouling agent (or a stain-proofing agent), a printability improver, a colorant, inorganic particles, and organic particles, as required within a range not contradictory to an object of the various embodiments.

The anchor coat agent may contain a solvent, as required, in order to dilute the anchor coat agent to a concentration facilitating coating. The solvent is not particularly limited as long as it does not contribute to reacting with the polymer as component (P) and other optional components or catalyzing (promoting) self-reactions (including deteriorative reactions) of these components. Examples of the solvent include 1-methoxy-2-propanol, ethyl acetate, n-butyl acetate, toluene, methyl ethyl ketone, methyl isobutyl ketone, diacetone alcohol, and acetone. As the solvent, these can be used singly or as a mixture of two or more thereof.

The anchor coat agent can be obtained by mixing and stirring these components.

A method for forming the anchor coat using the anchor coat agent is not particularly limited, and any known web application method can be used. Examples of the method include roll coating, gravure coating, reverse coating, roll brushing, spray coating, air knife coating, and die coating.

The thickness of the anchor coat is not particularly limited, but it may be usually 0.1 μm or more, and preferably 0.5 μm or more from a viewpoint of adhesiveness to the first hard coat or the resin film. When the anchor coat agent contains the polymer as component (P), the thickness of the anchor coat is preferably 1 μm or more, more preferably 2 μm or more, and still more preferably 2.5 μm or more from a viewpoint of the weather resistance of a hard coat laminate to be formed. Meanwhile, the thickness of the anchor coat may be usually 60 μm or less, preferably 30 μm or less, more preferably 20 μm or less, still more preferably 10 μm or less, and most preferably 5 μm or less from viewpoints of satisfactorily keeping the bending resistance of the hard coat laminated film according to the various embodiments, causing the hard coat laminated film to be easily handled as a film roll, and suppressing curling. In one embodiment, the thickness of the anchor coat is preferably 0.1 µm or more and 60 µm or less, 0.1 µm or more and 30 µm or less, 0.1 µm or more and 20 µm or less, 0.1 µm or more and 10 µm or less, 0.1 µm or more and 5 µm or less, 0.5 µm or more and 60 µm or less, 0.5 µm or more and 30 µm or less, 0.5 µm or more and 20 µm or less, 0.5 µm or more and 10 µm or less, 0.5 µm or more and 5 µm or less, 1 µm or more and 60 µm or less, 1 µm or more and 30 µm or less, 1 µm or more and 20 µm or less, 1 µm or more and 10 µm or less, 1 µm or more and 5 µm or less, 2 µm or more and 60 µm or less, 2 µm or more and 30 µm or less, 2 µm or more and 20 µm or less, 2 µm or more and 10 µm or less, 2 µm or more and 5 µm or less, 2.5 µm or more and 60 µm or less, 2.5 µm or more and 30 µm or less, 2.5 µm or more and 20 µm or less, 2.5 µm or more and 10 µm or less, or 2.5 µm or more and 5 µm or less.

The visible light transmittance of the hard coat laminated film according to the various embodiments may be preferably 80% or more, more preferably 85% or more, still more preferably 88% or more, and most preferably 90% or more in both of an embodiment having no anchor coat and an embodiment having an anchor coat. A higher visible light transmittance is preferable. Such a hard coat laminated film can be suitably used as a glass window film for exterior use for the purposes of protection, prevention of scattering, ultraviolet shielding, and infrared shielding and the like of window glass for building, a window of an automobile, etc. Such a hard coat laminated film can be suitably used as a hard coat laminated film for the purposes of protection, prevention of scattering, and the like of a display face plate in an image display device, particularly an image display device used in places receiving direct sunlight such as car navigation or digital signage.

The visible light transmittance is measured in accordance with 6.4 visible light transmittance test in JIS A5759: 2016 under conditions where a surface opposite to the surface on the side of the first hard coat of the hard coat laminated film is a bonded surface with plate glass, and a film surface of a test piece is directed to a light source.

The UV transmittance of the hard coat laminated film according to the various embodiments may be preferably 2% or less, more preferably 1% or less, still more preferably 0.5% or less, and most preferably 0.1% or less in both of an embodiment having no anchor coat and an embodiment having an anchor coat. A lower UV transmittance is preferable. Such a hard coat laminated film can be expected to have very excellent weather resistance.

The UV transmittance is measured in accordance with 6.7 UV transmittance test in JIS A5759: 2016 under conditions where a surface opposite to the surface on the side of the first hard coat of the hard coat laminated film is a bonded surface with plate glass, and a film surface of a test piece is directed to a light source.

When the hard coat laminated film according to the various embodiments is subjected to an accelerated weather resistance test for 1000 hours and a subsequent square lattice pattern test according to the test (iv) in the following Examples in both of an embodiment having no anchor coat and an embodiment having an anchor coat, the hard coat laminated film may be preferably classification 4, classification 3, classification 2, classification 1, or classification 0; more preferably classification 3, classification 2, classification 1, or classification 0; still more preferably classification 2, classification 1, or classification 0; and yet still more preferably classification 1 or classification 0. The adhesion force between the layers has such weather resistance, whereby the hard coat laminated film according to the various embodiments can be suitably used as a glass window film for exterior use for the purposes of protection, prevention of scattering, ultraviolet shielding, and infrared shielding and the like of window glass for building, a window of an automobile, etc. Such a hard coat laminated film can be suitably used as a hard coat laminated film for the purposes of protection, prevention of scattering, and the like of a display face plate in an image display device, particularly an image display device used in places receiving direct sunlight such as car navigation or digital signage.

3. Glass Window Film for Exterior Use

A glass window film for exterior use according to the various embodiments is a hard coat laminated film including at least one layer of first hard coat, and used in a state where it is applied to the outdoor side of glass for structure such as window glass. Typical examples of the glass for structure herein include, but are not limited to, applications receiving direct sunlight such as window glass for building and a window of an automobile. Examples of the glass window film for exterior use according to the various embodiments include, but are not limited to, a film including, in order from a surface on a side upon which sunlight is incident in an actual state of use, a first hard coat, an anchor coat, a resin film layer, and a pressure-sensitive adhesive layer, a film including a first hard coat, a resin film layer, and a pressure-sensitive adhesive layer; a film including a first hard coat, an anchor coat, a resin film layer, a functional layer, and a pressure-sensitive adhesive layer; a film including a first hard coat, a resin film layer, a functional layer, and a pressure-sensitive adhesive layer; a film including a first hard coat, an anchor coat, a functional layer, a resin film layer, and a pressure-sensitive adhesive layer; a film including a first hard coat, a functional layer, a resin film layer, and an adhesive layer; a film including a first hard coat, an anchor coat, a functional layer, a resin film layer, a functional layer, and a pressure-sensitive adhesive layer; and a film including a first hard coat, a functional layer, a resin film layer, a functional layer, and a pressure-sensitive adhesive layer.

The first hard coat, the anchor coat, and the resin film layer have been described above in the description of the hard coat laminated film according to the various embodiments.

The pressure-sensitive adhesive layer functions to apply the glass window film for exterior use according to the various embodiments to glass. A pressure-sensitive adhesive used to form the pressure-sensitive adhesive layer is not limited as long as it has a sufficient adhesive force to glass, and any pressure-sensitive adhesive can be used. The pressure-sensitive adhesive is preferably a transparent pressure-sensitive adhesive that has a sufficient adhesive force to glass and is transparent. Examples of the transparent pressure-sensitive adhesive include an acrylic pressure-sensitive adhesive, a urethane-based pressure-sensitive adhesive, and a silicon-based pressure-sensitive adhesive. As the transparent pressure-sensitive adhesive, these can be used singly or as a mixture of two or more thereof.

The pressure-sensitive adhesive may further contain an optional component(s) other than the pressure-sensitive adhesive component as required within a range not contradictory to an object of the various embodiments. Examples of the optional component include additives such as a photopolymerization initiator, a compound having two or more isocyanate groups per molecule, an antistatic agent, a surfactant, a leveling agent, a thixotropy-imparting agent, an anti-fouling agent (or a stain-proofing agent), a printability improver, an antioxidant, a weather resistance stabilizer, a light resistance stabilizer, an ultraviolet absorber, a heat stabilizer, a pigment, inorganic particles, and organic particles. The blending amount of the optional component is usually about 0.01-10 parts by mass with respect to 100 parts by mass of the pressure-sensitive adhesive component.

The pressure-sensitive adhesive may contain an ultraviolet absorber. Thereby, the weather resistance of pressure-sensitive adhesion strength can be enhanced. The blending amount of the ultraviolet absorber may be preferably about 0.01-5 parts by mass, more preferably about 0.05-2 parts by mass, and still more preferably about 0.1-1 part by mass with respect to 100 parts by mass of the base resin of the pressure-sensitive adhesive. In another embodiment, the blending amount of the ultraviolet absorber may be preferably 1-50 parts by mass, more preferably 5-30 parts by mass, and still more preferably 10-25 parts by mass with respect to 100 parts by mass of the base resin of the pressure-sensitive adhesive. The amount of the ultraviolet absorber may be varied in consideration of the following state. For example, when a hinged window such as an outswinging window or a casement window is opened, the window may receive sunlight from the side of a surface that is usually placed an indoor side (when the window is closed).

The thickness of the pressure-sensitive adhesive layer is not particularly limited, but it may be usually 5 μm or more, preferably 10 μm or more, more preferably 15 μm or more, and still more preferably 20 μm or more from a viewpoint of pressure-sensitive adhesion strength. Meanwhile, the thickness of the pressure-sensitive adhesive layer may be usually 100 μm or less, preferably 60 μm or less, more preferably 40 μm or less, and still more preferably 30 μm or less from a viewpoint of thickness reduction. In one embodiment, the thickness of the pressure-sensitive adhesive layer may be usually 5 μm or more and 100 μm or less, preferably 5 μm or more and 60 μm or less, 5 μm or more and 40 μm or less, 5 μm or more and 30 μm or less, 10 μm or more and 100 μm or less, 10 μm or more and 60 μm or less, 10 μm or more and 40 μm or less, 10 μm or more and 30 μm or less, 15 μm or more and 100 μm or less, 15 μm or more and 60 μm or less, 15 μm or more and 40 μm or less, 15 μm or more and 30 μm or less, 20 μm or more and 100 μm or less, 20 μm or more and 60 μm or less, 20 μm or more and 40 μm or less, or 20 μm or more and 30 μm or less.

A method for forming the pressure-sensitive adhesive layer is not particularly limited, and may be any method. Examples of the method include a method for forming the pressure-sensitive adhesive layer directly or with the anchor coat interposed therebetween, on the surface of the glass window film for exterior use on which the pressure-sensitive adhesive layer is formed, using application processes such as roll coating, gravure coating, reverse coating, die coating, dip coating, spray coating, spin coating, and air knife coating. Examples of the method include a method for forming a pressure-sensitive adhesive layer on the surface of any film substrate (for example, a biaxially stretched polyethylene terephthalate-based resin film, a biaxially stretched polypropylene-based resin film, and the like), using application processes such as roll coating, gravure coating, reverse coating, die coating, dip coating, spray coating, spin coating, and air knife coating, and transferring the layer onto the surface of the glass window film for exterior use on which the pressure-sensitive adhesive layer is formed, directly or with the anchor coat interposed therebetween.

Examples of the functional layer include those having functions such as infrared shielding, infrared reflecting, electromagnetic wave shielding, electromagnetic wave reflecting, view controlling (blinding), and view angle controlling.

The number of the functional layer is not limited to one, and may be two or more. When the number of the functional layer is two or more, the number of types thereof is not limited to one, and may be two or more.

The thickness of the functional layer may be appropriately selected in consideration of a function to be imparted, a method for forming the layer, and the like.

Figure 5:
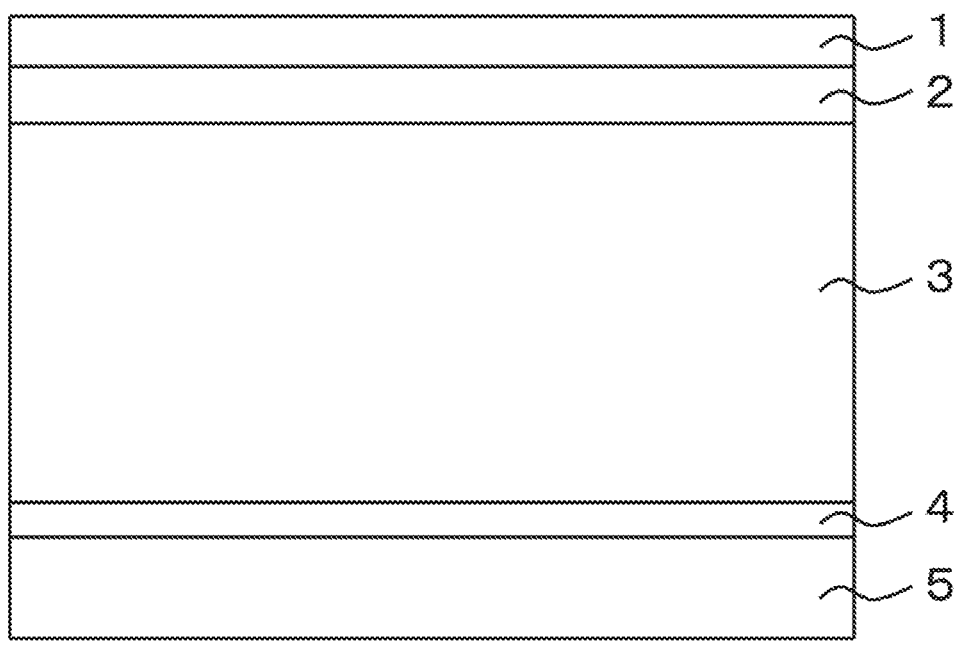
FIG. 5 is a conceptual view of a cross section showing an example of a glass window film for exterior use according to the various embodiments.

FIG. 5 is a conceptual view of a cross section showing an example of a glass window film for exterior use according to the various embodiments. A first hard coat 1, an anchor coat 2, a resin film layer 3, a coat 4 having an infrared shielding function, and a pressure-sensitive adhesive layer 5 are provided in order from a surface on a side upon which sunlight is incident in an actual state of use.

Since the glass window film for exterior use according to the various embodiments has good characteristics as described above, the glass window film for exterior use can be similarly suitably used not only for glass for structure such as window glass for building and a window of an automobile but also for a transparent resin plate (including a laminate) substituting the glass for structure and a transparent resin plate (including a laminate) substituting glass such as a display face plate of an image display device. This will be immediately understood by those skilled in the art.

4. Article

An article according to the various embodiments includes a cured product of the active energy ray curable resin composition according to the various embodiments. The article according to the various embodiments usually includes a hard coat formed on a surface thereof by using a coating material containing the active energy ray curable resin composition according to the various embodiments. The hard coat is typically formed on the surface of the article according to the various embodiments, particularly on a portion thereof exposed to direct sunlight. Therefore, the article according to the various embodiments including such a hard coat has excellent weather resistance.

The article according to the various embodiments can be produced by, for example, forming a hard coat on the surface of a resin substrate molded into a desired shape by any method using the coating material containing the active energy ray curable resin composition according to the various embodiments.

A preferable article according to the various embodiments includes a hard coat formed by using the coating material containing the active energy ray curable resin composition according to the various embodiments, and a layer formed of an anchor coat agent containing (P) a polymer (resin or oligomer) comprised of a structural unit derived from a (meth)acrylate having one or more of one or more types of backbones selected from the group consisting of a benzotriazole backbone, a triazine backbone, and a benzophenone backbone per molecule. As the anchor coat agent, those described above in the description of the hard coat laminated film according to the various embodiments can be used. A preferable article according to the various embodiments usually includes an anchor coat formed by using the anchor coat agent containing the polymer (P) on a surface thereof, and a hard coat formed thereon by using a coating material containing the active energy ray curable resin composition according to the various embodiments. The hard coat and the anchor coat are typically formed on the surface of a preferable article according to the various embodiments, particularly, a portion thereof that is exposed to direct sunlight.

Therefore, the preferable article according to the various embodiments has particularly excellent weather resistance.

The preferable article according to the various embodiments can be produced by, for example, forming an anchor coat on the surface of the substrate using an anchor coat agent containing the polymer (P), and forming a hard coat thereon using a coating material containing the active energy ray curable resin composition according to the various embodiments.

A method for producing the substrate is not particularly limited.

Examples of the method for producing the substrate include a method for subjecting any resin sheet to so-called three-dimensional molding such as membrane press molding, pressure press molding, vacuum molding, or vacuum pressure molding; a method for subjecting any thermoplastic resin to injection molding (including insert molding), blow molding, or extrusion molding; and a method for injecting any curable resin into a mold having a desired shape and curing the curable resin.

A method for forming the hard coat is not particularly limited, and any known method can be used. Examples of the method for forming the hard coat include methods such as dip coating, spray coating, spin coating, and air knife coating. Application is not limited to once, and may be repeated twice or more. Furthermore, in a case where the portion where the hard coat of the article according to the various embodiments is formed is planar, methods such as roll coating, gravure coating, reverse coating, and die coating may be applied.

The thickness of the hard coat is not particularly limited, but it may be usually 0.1 μm or more, preferably 0.5 μm or more, more preferably 1 μm or more, and still more preferably 1.5 μm or more from viewpoints of the weather resistance and abrasion resistance of the article. Meanwhile, the thickness of the hard coat may be usually 60 μm or less, preferably 30 μm or less, more preferably 20 μm or less, still more preferably 10 μm or less, and most preferably 5 μm or less from a viewpoint of the productivity of the article according to the various embodiments. In one embodiment, the thickness of the hard coat may be usually 0.1 μm or more and 60 μm or less, preferably 0.1 μm or more and 30 μm or less, 0.1 μm or more and 20 μm or less, 0.1 μm or more and 10 μm or less, 0.1 μm or more and 5 μm or less, 0.5 μm or more and 60 μm or less, 0.5μm or more and 20 μm or less, 0.5 μm or more and 10 μm or less, 0.5 μm or more and 5 μm or less, 1 μm or more and 60 μm or less, 1 μm or more and 30 μm or less, 1 μm or more and 20 μm or less, 1 μm or more and 10 μm or less, 1 μm or more and 5 μm or less, 1.5 μm or more and 60 μm or less, 1.5 μm or more and 30 μm or less, 1.5 μm or more and 20 μm or less, 1.5 μm or more and 10 μm or less, or 1.5 μm or more and 5 μm or less.

A method for forming the anchor coat is not particularly limited, and any known method can be used. Examples of the method for forming the anchor coat include methods such as dip coating, spray coating, spin coating, and air knife coating. Application is not limited to once, and may be repeated twice or more. Furthermore, in a case where the portion where the anchor coat of the article according to the various embodiments is formed is planar, methods such as roll coating, gravure coating, reverse coating, and die coating may be applied.

The thickness of the anchor coat is not particularly limited, but may be usually 0.1 μm or more, and preferably 0.5 μm or more from a viewpoint of adhesiveness. The thickness of the anchor coat may be more preferably 1 μm or more, still more preferably 2 μm or more, and most preferably 2.5 μm or more from a viewpoint of the weather resistance of the article. Meanwhile, the thickness of the anchor coat may be usually 60 μm or less, preferably 30 μm or less, more preferably 20 μm or less, still more preferably 10 μm or less, and most preferably 5 μm or less from a viewpoint of the productivity of the article according to the various embodiments. In one embodiment, the thickness of the anchor coat may be usually 0.1 μm or more and 60 μm or less, preferably 0.1 μm or more and 30 μm or less, 0.1 μm or more and 20 μm or less, 0.1 μm or more and 10 μm or less, 0.1 μm or more and 5 μm or less, 0.5 μm or more and 60 μm or less, 0.5 μm or more and 30 μm or less, 0.5 μm or more and 20 μm or less, 0.5 μm or more and 10 μm or less, 0.5 μm or more and 5 μm or less, 1 μm or more and 60 μm or less, 1 μm or more and 30 μm or less, 1 μm or more and 20 μm or less, 1 μm or more and 10 μm or less, 1 μm or more and 5 μm or less, 2 μm or more and 60 μm or less, 2 μm or more and 30 μm or less, 2 μm or more and 20 μm or less, 2 μm or more and 10 μm or less, 2 μm or more and 5 μm or less, 2.5 μm or more and 60 μm or less, 2.5 μm or more and 30 μm or less, 2.5 μm or more and 20 μm or less, 2.5 μm or more and 10 μm or less, or 2.5 μm or more and 5 μm or less.

Examples of the article according to various embodiments include, but are not particularly limited to, an automobile, an instrument panel, shift knob, and window thereof, and members such as a windshield; a window and door for building, and the like; information electronic devices such as a smartphone, a tablet, a terminal, a car navigation system, a digital camera, and a personal computer, and members such as a housing thereof; household electric appliances such as a television, a refrigerator, a vacuum cleaner, a microwave furnace, and an air conditioner, and members such as housings, door bodies, and lid bodies thereof; articles such as a cupboard and a clothes rack, and members such as door bodies and lid bodies thereof; solar cells, and members such as housings and front plates thereof; and members used for the articles (including the members of the articles).

In another embodiment, there is provided a hard coat laminated film as follows:

A hard coat laminated film, which includes a hard coat, an anchor coat, and a resin film layer in order from a surface on a side upon which sunlight is incident in an actual state of use, wherein the hard coat is formed of a first coating material (that may be free of inorganic particles) containing a polymer (those similar to the above-mentioned polymers are exemplified) comprised of a structural unit derived from a (meth)acrylate having one or more of one or more types of backbones selected from the group consisting of a benzotriazole backbone, a triazine backbone, and a benzophenone backbone per molecule; the anchor coat is formed of a second coating material containing a polymer (those similar to the above-mentioned polymers are exemplified) comprised of a structural unit derived from a (meth)acrylate having one or more of one or more types of backbones selected from the group consisting of a benzotriazole backbone, a triazine backbone, and a benzophenone backbone per molecule; and the hard coat laminated film satisfies one, any two, or any three of the following properties (i), (ii), and (iv): (i) a visible light transmittance (measured by the above-mentioned method) of 80% or more, preferably 85% or more, more preferably 88% or more, and still more preferably 90% or more; (ii) a UV transmittance (measured by the above-mentioned method) of 1% or less, preferably 0.5% or less, and more preferably 0.1% or less; (iv) adhesiveness of classification 4, classification 3, classification 2, classification 1, or classification 0 exhibited when (1) a test piece is set such that a hard coat side surface of the hard coat laminated film is an irradiated surface using a sunshine carbon arc type weather resistance tester specified in JIS B7753: 2007 in accordance with 6.10 weather resistance in JIS A5759: 2016, and the test piece is subjected to an accelerated weather resistance treatment for 1000 hours under a condition shown in Table 11 of 6.10 weather resistance in JIS A5759: 2016, and (2) the hard coat laminated film subjected to the accelerated weather resistance treatment is then subjected to a square lattice pattern test by forming a square lattice pattern cut on the hard coat laminated film from a hard coat surface side according to JIS K5600-5-6: 1999.

EXAMPLES

Hereinafter, the various embodiments will be described by way of Examples, but the various embodiments are not limited thereto.

Measuring Methods (i) Visible Light Transmittance

A visible light transmittance was measured in accordance with 6.4 visible light transmittance test in JIS A5759: 2016 under conditions where a surface opposite to the surface on the side of a first hard coat of a hard coat laminated film or glass window film for exterior use was a bonded surface with plate glass, and a film surface of a test piece was directed to a light source.

(ii) UV Transmittance

A UV transmittance was measured in accordance with 6.7 UV transmittance test in JIS A5759: 2016 under conditions where a surface opposite to the surface on the side of a first hard coat of a hard coat laminated film or glass window film for exterior use was a bonded surface with plate glass, and a film surface of a test piece was directed to a light source.

(iii) Square Lattice Pattern Test (Adhesiveness)

According to JIS K5600-5-6:1999, a square lattice pattern cut consisting of 100 cells (1 cell=1 mm×1 mm) was formed on a hard coat laminated film from a first hard coat surface side. Thereafter, a tape for an adhesion test was pasted on the square lattice pattern, was rubbed with fingers, and was then peeled off. The criteria for evaluation for adhesiveness were in accordance with Table 1 in the above standard of JIS.

Classification 0: Edges of the cuts were completely smooth, and none of the squares of the lattice was peeled off.

Classification 1: Small peeling of a coat was observed at intersections of the cuts. A cross-cut area of clearly not more than 5% was affected.

Classification 2: A coat was peeled off along edges and/or at intersections of the cuts. A cross-cut area of clearly more than 5% but not more than 15% was affected.

Classification 3: A coat was largely peeled off along edges of the cuts partially or entirely, and/or various portions of squares were peeled off partially or entirely. A cross-cut area of clearly more than 15% but not more than 35% was affected.

Classification 4: A coat was largely peeled off along edges of the cuts partially or entirely, and/or some portions of squares were peeled off partially or entirely. A cross-cut area of clearly more than 35% but not more than 65% was affected.

Classification 5: A case where the degree of peeling was more than that in Classification 4.

(iv) Square Lattice Pattern Test After Accelerated Weather Resistance Test (Weather Resistance Adhesiveness)

A test piece was set such that a first hard coat side surface of a glass window film for exterior use was an irradiated surface using a sunshine carbon arc type weather resistance tester (SWOM) "Sunshine Weather Meter S300" (trade name) (manufactured by Suga Test Instruments Co., Ltd.) specified in JIS B7753: 2007 in accordance with 6.10 weather resistance in JIS A5759: 2016, and the test piece was subjected to a treatment for 1000 hours under a condition shown in Table 11 of 6.10 weather resistance in JIS A5759: 2016, that is, under conditions of irradiance of 255±25.5 W/m$^2$ (glass filter specification: spectral transmittances of 2% or less at 275 nm and 90% or more at 400 nm), water spray for 18 minutes per 120 minutes, a black panel temperature of 63±3° C., and a relative humidity of 50±5%. The test piece was then subjected to a square lattice pattern test according to the test (iii) to evaluate the adhesiveness.

(v) Steel Wool Resistance Test

A hard coat laminated film was placed on a Gakushin tester (friction tester: type 2) according to JIS L0849:2013 such that a first hard coat thereof was a front surface. Then, a steel wool of #0000 was attached to a friction terminal of the Gakushin tester, and a load of 30 g was then placed. A surface of the test piece was rubbed reciprocatingly five times under conditions where the moving speed and moving distance of the friction terminal were respectively set to 300 mm/min and 30 mm, and then the rubbed portion was visually observed. The steel wool resistance of the test piece was evaluated according to the following criteria.

◎ (Good): No scratch was observed.

○ (Generally good): 1 to 5 scratches were observed.

Δ (Slightly poor): 6 to 15 scratches were observed.

× (Poor): 16 or more scratches were observed.

(vi) Pencil Hardness

The pencil hardness on a first hard coat surface of a hard coat laminated film was measured according to JIS K5600-5-4: 1999 using a pencil "UNI" (trade name) manufactured by Mitsubishi Pencil Co., Ltd. under a condition of a load of 200 g.

(vii) Yellowness Index

The yellowness index was measured according to JIS K7105:1981 using a chromaticity meter "SolidSpec-3700" (trade name) manufactured by Shimadzu Corporation.

(viii) Yellowness Index After Accelerated Weather Resistance Test (Yellowing Resistance)

A test piece was set such that a first hard coat side surface of a hard coat laminated film was an irradiated surface using a sunshine carbon arc type weather resistance tester (SWOM) "Sunshine Weather Meter 5300" (trade name) (manufactured by Suga Test Instruments Co., Ltd.) specified in JIS B7753: 2007 in accordance with 6.10 weather resistance in JIS A5759: 2016, and the test piece was subjected to a treatment for 2000 hours under a condition shown in Table 11 of 6.10 weather resistance in JIS A5759: 2016, that is, under conditions of irradiance of 255±25.5 W/m$^2$ (glass filter specification: spectral transmittances of 2% or less at 275 nm and 90% or more at 400 nm), water spray for 18 minutes per 120 minutes, a black panel temperature of 63±3° C., and a relative humidity of 50±5%. The yellowness index of the test piece was then measured according to the test (vii).

(ix) Mandrel Test (Index of Bending Resistance)

A sample collected so as to have a size of 100 mm in the machine direction and 50 mm in the lateral direction of the hard coat laminated film from the hard coat laminated film was subjected to a bending resistance test according to a cylindrical mandrel method in accordance with JIS K 5600-5-1: 1999. The diameter of a mandrel having the smallest diameter among non-breaking mandrels was determined. The bending resistance (crack resistance) was evaluated according to the following criteria.

◎ (Good): 10 mm or less.

○ (Generally good): 12 mm, 16 mm, or 20 mm

Δ (Slightly poor): 25 mm or 32 mm

× (Poor): breaking occurred even when the diameter of the mandrel was 32 mm (x) Surface Smoothness (Surface Appearance)

The surfaces (both surfaces) of a hard coat laminated film were visually observed while being irradiated with light from a fluorescent lamp at a variety of angles of incidence, and the surface smoothness (the external appearances of the surfaces) were evaluated according to the following criteria.

◎ (Good): The surface exhibited no undulations or scratches. Even when being held up nearby to the light, there was no impression of cloudiness.

○ (Generally good): When being held up nearby to the light, some portions of the surface exhibited a slight impression of cloudiness.

Δ (Slightly poor): When being looked closely into, the surface had a few recognized undulations and scratches. It also gave an impression of cloudiness.

× (Poor): The surface had a large number of recognized undulations and scratches. It also gave a definite impression of cloudiness.

(xi) Adhesive Force

Using a float plate glass (thickness: 3 mm) specified in JIS R3202:2011 manufactured by Testpiece, Co., Ltd. as a test plate, a 180 degree peeling adhesive force of a glass window film for exterior use with respect to the test plate was measured in accordance with JIS A5759:2008 at a speed of 300 mm/min at a temperature of 23° C. This unit is N/inch, which is converted to N/mm according to 1 inch=25.4 mm (xii) Adhesive Force After Accelerated Weather Resistance Test (Weather Resistance Adhesive Force)

A test piece was set such that a first hard coat side surface of a glass window film for exterior use was an irradiated surface using a sunshine carbon arc type weather resistance tester (SWOM) "Sunshine Weather Meter 5300" (trade name) (manufactured by Suga Test Instruments Co., Ltd.) specified in JIS B7753: 2007 in accordance with 6.10 weather resistance in JIS A5759: 2016, and the test piece was subjected to a treatment for 2000 hours under a condition shown in Table 11 of 6.10 weather resistance in JIS A5759: 2016, that is, under conditions of irradiance of 255±25.5 W/m$^2$ (glass filter specification: spectral transmittances of 2% or less at 275 nm and 90% or more at 400 nm), water spray for 18 minutes every 120 minutes, a black panel temperature of 63±3° C., and a relative humidity of 50±5%. The adhesive force of the glass window film for exterior use was then measured according to the test (xi). This unit is N/inch, which is converted to N/mm according to 1 inch=25.4 mm Raw Materials Used (A) UV-Absorbing Polymer (A-1) 58 parts by mass (36 mol %) of 2-[2-hydroxy-5-(2-methacryloyloxy-ethyl)phenyl]-2H-benzotriazole, 17 parts by mass (34 mol %) of methyl methacrylate, 9 parts by mass (10 mol %) of hexamethylene diisocyanate, 16 parts by mass (20 mol %) of 2-isocyanatoethyl methacrylate, and 37 parts by mass (57 mol %) of 2-hydroxyethyl acrylate were placed in a reactor equipped with a reflux condenser and a stirrer, and reacted at a temperature of 70-80° C. for 10 hours under a nitrogen atmosphere together with a methyl ethyl ketone-n-butyl acetate-toluene mixed solvent (volume ratio: 1:1:2) as a dilution solvent and 2,2'-azobisisobutyronitrile as a catalyst, to obtain a UV-absorbing polymer (A-1).

(A-2) 47 parts by mass (29 mol %) of 2-[2-hydroxy-5-(2-methacryloyloxy-ethyl)phenyl]-2H-benzotriazole, 8 parts by mass (17 mol %) of methyl methacrylate, 32 parts by mass (38 mol %) of hexamethylene diisocyanate, 13 parts by mass (17 mol %) of 2-isocyanatoethyl methacrylate, and 84 parts by mass (128 mol %) of 2-hydroxyethyl acrylate were placed in a reactor equipped with a reflux condenser and a stirrer, and reacted at a temperature of 70-80° C. for 10 hours under a nitrogen atmosphere together with a methyl ethyl ketone-n-butyl acetate-toluene mixed solvent (volume ratio: 1:1:2) as a dilution solvent and 2,2'-azobisisobutyronitrile as a catalyst, to obtain a UV-absorbing polymer (A-2).

(A-3) 59 parts by mass (35 mol %) of 2-[2-hydroxy-5-(2-methacryloyloxy-ethyl)phenyl]-2H-benzotriazole, 24 parts by mass (45 mol %) of methyl methacrylate, 9 parts by mass (10 mol %) of hexamethylene diisocyanate, 8 parts by mass (10 mol %) of 2-isocyanatoethyl methacrylate, and 22 parts by mass (42 mol %) of 2-hydroxyethyl acrylate were placed in a reactor equipped with a reflux condenser and a stirrer, and reacted at a temperature of 70-80° C. for 10 hours under a nitrogen atmosphere together with a methyl ethyl ketone-n-butyl acetate-toluene mixed solvent (volume ratio: 1:1:2) as a dilution solvent and 2,2'-azobisisobutyronitrile as a catalyst, to obtain a UV-absorbing polymer (A-3).

(B) Polyfunctional (meth)acrylate (B-1) Dipentaerythritol hexaacrylate "KAYARAD DPHA" (trade name) manufactured by Nippon Kayaku Co., Ltd.

(B-2) Pentaerythritol triacrylate (C) Photopolymerization Initiator (C-1) Alkylphenone photopolymerization initiator (1-hydroxy-cyclohexyl-phenyl-ketone) "IRGACURE 184" (trade name) manufactured by BASF SE.

(P) Anchor Coat Polymer (P-1) 32 parts by mass (14 mol %) of 2-(2-hydroxy-5-(2-(methacryloyloxy)-ethyl)phenyl)-2H-benzotriazole, 54 parts by mass (76 mol %) of methyl methacrylate, 5 parts by mass (5 mol %) of 2-hydroxyethyl methacrylate, and 9 parts by mass (5 mol %) of caprolactone methacrylate were placed in a reactor equipped with a reflux condenser and a stirrer, and reacted at a temperature of 70-80° C. for 10 hours under a nitrogen atmosphere together with a methyl ethyl ketone-n-butyl acetate-toluene mixed solvent (volume ratio: 1:1:2) as a dilution solvent and 2,2'-azobisisobutyronitrile as a catalyst, to obtain an anchor coat polymer (P-1).

(P-2) 20 parts by mass (8 mol %) of 2-(2-hydroxy-5-(2-(methacryloyloxy)-ethyl)phenyl)-2H-benzotriazole, 65 parts by mass (82 mol %) of methyl methacrylate, 5 parts by mass (5 mol %) of 2-hydroxyethyl methacrylate, and 10 parts by mass (5 mol %) of caprolactone methacrylate were placed in a reactor equipped with a reflux condenser and a stirrer, and reacted at a temperature of 70-80° C. for 10 hours under a nitrogen atmosphere together with a methyl ethyl ketone-n-butyl acetate-toluene mixed solvent (volume ratio: 1:1:2) as a dilution solvent and 2,2'-azobisisobutyronitrile as a catalyst, to obtain an anchor coat polymer (P-2).

(P-3) 83 parts by mass (90 mol %) of methyl methacrylate, 6 parts by mass (5 mol %) of 2-hydroxyethyl methacrylate, and 11 parts by mass (5 mol %) of caprolactone methacrylate were placed in a reactor equipped with a reflux condenser and a stirrer, and reacted at a temperature of 70-80° C. for 10 hours under a nitrogen atmosphere together with a methyl ethyl ketone-n-butyl acetate-toluene mixed solvent (volume ratio: 1:1:2) as a dilution solvent and 2,2'-azobisisobutyronitrile as a catalyst, to obtain an anchor coat polymer (P-3).

(Q) Compound Having Two or More Isocyanate Groups Per Molecule (Q-1) "Coronate HX" (trade name) manufactured by Tosoh Corporation.

(R) Anchor Coat Agent (Anchor Coat-Forming Coating Material)

(R-1) 100 parts by mass of the component (P-1) in terms of solid content and 10 parts by mass of the component (Q-1) were mixed and stirred to obtain a mixture, and the mixture was diluted to a solid content concentration of 50% by mass using a methyl ethyl ketone-n-butyl acetate-toluene mixed solvent (volume ratio: 1:1:2), to obtain a coating material.

(R-2) 100 parts by mass of the component (P-2) in terms of solid content and 10 parts by mass of the component (Q-1) were mixed and stirred to obtain a mixture, and the mixture was diluted to a solid content concentration of 50% by mass using a methyl ethyl ketone-n-butyl acetate-toluene mixed solvent (volume ratio: 1:1:2), to obtain a coating material.

(R-3) 100 parts by mass of the component (P-3) in terms of solid content and 12 parts by mass of the component (Q-1) were mixed and stirred to obtain a mixture, and the mixture was diluted to a solid content concentration of 50% by mass using a methyl ethyl ketone-n-butyl acetate-toluene mixed solvent (volume ratio: 1:1:2), to obtain a coating material.

(S) Pressure-Sensitive Adhesive Layer-Forming Coating Material (S-1) 100 parts by mass of an acrylic pressure-sensitive adhesive "ORIBAIN BPS 5296" (trade name) manufactured by TOYOCHEM CO., LTD., 0.5 parts by mass (0.2 parts by mass in terms of solid content) of an isocyanate-based curing agent "ORIBAIN BXX4773" (trade name) manufactured by TOYOCHEM CO., LTD., 20 parts by mass of a benzophenone-based UV absorber (2,2',4,4'-tetrahydroxybenzophenone) "SEES ORB 106" (trade name) manufactured by SHIPRO KASEI KAISHA, LTD., and 70 parts by mass of ethyl acetate were mixed and stirred to obtain a coating material.

Example 1

1. Preparation of Active Energy Ray Curable Resin Composition 100 parts by mass of the component (A-1) in terms of solid content, 65 parts by mass of the component (B-1), 40 parts by mass of the component (B-2), and 10 parts by mass of the component (C-1) were mixed and stirred to obtain a mixture, and the mixture was diluted to a solid content concentration of 50% by mass using a methyl ethyl ketone-n-butyl acetate-toluene mixed solvent (volume ratio: 1:1:2), to obtain an active energy ray curable resin composition.

2. Production of Hard Coat Laminated Film (1) The anchor coat-forming coating material (R-1) was applied onto one surface of a double-sided easily adhesive biaxially stretched polyethylene terephthalate resin film "Lumirror" (trade name) manufactured by Toray Industries, Inc. and having a thickness of 50 μm using a film mayer bar type coating apparatus such that the thickness of the anchor coat-forming coating material after curing was set to 3 μm, and dried and cured in a drying furnace, to form an anchor coat.

(2) Next, the active energy ray curable resin composition obtained in the above 1 was applied onto the surface of the anchor coat formed in the step (1) using a film mayer bar type coating apparatus such that the thickness of the active energy ray curable resin composition after curing was set to 2 μm, dried in a drying furnace, and then irradiated with ultraviolet rays, to form a hard coat, thereby obtaining a hard coat laminated film. The hard coat laminated film was subjected to the tests (i) to (x). The results are shown in Table 1. In Table, "HC" means an active energy ray curable resin composition which is a hard coat-forming coating material, or a hard coat formed therefrom. The term "AC coating material" means an anchor coat-forming coating material. The term "result 1" means the evaluation result of the hard coat laminated film. The term "result 2" means the evaluation result of a glass window film for exterior use described later.

3. Production of Glass Window Film for Exterior Use

The pressure-sensitive adhesive layer-forming coating material (S-1) was applied onto a surface opposite to the anchor coat-forming surface of the resin film of the hard coat laminated film obtained in the above 2 using a roll coater such that the dry thickness of the pressure-sensitive adhesive layer-forming coating material was set to 25 μm, and dried in a drying furnace, to form a pressure-sensitive adhesive layer, thereby obtaining a glass window film for exterior use including a first hard coat, an anchor coat, a resin film layer, and a pressure-sensitive adhesive layer in order from a surface on a side upon which sunlight was incident in an actual state of use. The glass window film for exterior use was subjected to the tests (i), (ii), (xi), and (xii). The results are shown in Table 1.

Example 2

In the same manner as in Example 1 except that the component (A-2) was used in place of the component (A-1), a hard coat laminated film and a glass window film for exterior use were produced, and the physical properties thereof were measured and evaluated. The results are shown in Table 1.

Example 3

In the same manner as in Example 1 except that the component (A-3) was used in place of the component (A-1), a hard coat laminated film and a glass window film for exterior use were produced, and the physical properties thereof were measured and evaluated. The results are shown in Table 1.

Examples 4 to 7

In the same manner as in Example 1 except that the type and blending amount of the polyfunctional (meth)acrylate as the component (B) and the blending amount of the photopolymerization initiator as the component (C-1) were changed as shown in Table 1 or 2, a hard coat laminated film and a glass window film for exterior use were produced, and the physical properties thereof were measured and evaluated. The results are shown in Table 1 or 2.

Examples 8 to 10

In the same manner as in Example 1 except that the thickness of a first hard coat or/and the thickness of an anchor coat was/were changed as shown in Table 2, a hard coat laminated film and a glass window film for exterior use were produced, and the physical properties thereof were measured and evaluated. The results are shown in Table 2.

Example 11

In the same manner as in Example 1 except that the anchor coat-forming coating material (R-2) was used in place of the anchor coat-forming coating material (R-1), a hard coat laminated film and a glass window film for exterior use s were produced, and the physical properties thereof were measured and evaluated. The results are shown in Table 2.

Example 12

In the same manner as in Example 1 except that the anchor coat-forming coating material (R-3) was used in place of the anchor coat-forming coating material (R-1), a hard coat laminated film and a glass window film for exterior use were produced, and the physical properties thereof were measured and evaluated. The results are shown in Table 2.

Example 13

In the same manner as in Example 1 except that the thickness of a first hard coat was changed to 5 μm, and an anchor coat was not formed, a hard coat laminated film and a glass window film for exterior use were produced, and the physical properties thereof were measured and evaluated. The results are shown in Table 2.

TABLE 1

| | | Example 1 | Example 2 | Example 3 | Example 4 | Example 5 | Example 6 |
|---|---|---|---|---|---|---|---|
| HC (parts by mass) | A-1 | 100 | — | — | 100 | 100 | 100 |
| | A-2 | — | 100 | — | — | — | — |
| | A-3 | — | — | 100 | — | — | — |
| | B-1 | 65 | 65 | 65 | 50 | 75 | 120 |
| | B-2 | 40 | 40 | 40 | — | 50 | 80 |
| | C-1 | 10 | 10 | 10 | 7 | 14 | 18 |
| HC thickness μm | | 2 | 2 | 2 | 2 | 2 | 2 |
| AC coating material | | R-1 | R-1 | R-1 | R-1 | R-1 | R-1 |
| AC thickness μm | | 3 | 3 | 3 | 3 | 3 | 3 |
| Result 1 | Visible light transmittance % | 90.7 | 90.6 | 90.6 | 90.1 | 90.9 | 91.0 |
| | UV transmittance % | 0.074 | 0.100 | 0.072 | 0.060 | 0.077 | 0.088 |
| | Adhesiveness | Class 0 | Class 0 | Class 0 | Class 0 | Class 0 | Class 0 |
| | Weather resistance adhesiveness | Class 2 | Class 4 | Class 2 | Class 1 | Class 2 | Class 3 |
| | Steel wool resistance | ◎ | ◎ | ◎ | ○ | ◎ | ◎ |
| | Pencil hardness | 2H | 2H | 2H | 1H | 2H | 3H |
| | Yellowness index | 1.0 | 0.8 | 1.0 | 1.2 | 1.0 | 0.9 |
| | Yellowing resistance | 3.2 | 3.2 | 3.2 | 3.3 | 3.2 | 3.2 |
| | Bending resistance | ◎ | ◎ | ◎ | ◎ | ◎ | ◎ |
| | Surface appearance | ◎ | ◎ | ◎ | ◎ | ◎ | ◎ |
| Pressure-sensitive adhesive layer-forming coating material | | S-1 | S-1 | S-1 | S-1 | S-1 | S-1 |
| Result 2 | Visible light transmittance % | 90.1 | 90.0 | 90.1 | 89.7 | 90.2 | 90.2 |
| | UV transmittance % | 0.074 | 0.100 | 0.072 | 0.060 | 0.077 | 0.088 |
| | Adhesive force N/inch | 17 | 17 | 17 | 17 | 17 | 17 |
| | Weather resistance adhesive force N/inch | 28 | 29 | 27 | 32 | 30 | 32 |

TABLE 2

| | | Example 7 | Example 8 | Example 9 | Example 10 | Example 11 | Example 12 | Example 13 |
|---|---|---|---|---|---|---|---|---|
| HC (parts by mass) | A-1 | 100 | 100 | 100 | 100 | 100 | 100 | 100 |
| | A-2 | — | — | — | — | — | — | — |
| | A-3 | — | — | — | — | — | — | — |
| | B-1 | 200 | 65 | 65 | 65 | 65 | 65 | 65 |
| | B-2 | 150 | 40 | 40 | 40 | 40 | 40 | 40 |
| | C-1 | 10 | 10 | 10 | 10 | 10 | 10 | 10 |
| HC thickness μm | | 2 | 5 | 2 | 5 | 2 | 2 | 5 |
| AC coating material | | R-1 | R-1 | R-11 | R-1 | R-2 | R-3 | — |
| AC thickness μm | | 3 | 3 | 5 | 5 | 3 | 3 | — |
| Result 1 | Visible light transmittance % | 90.6 | 89.6 | 89.8 | 89.4 | 90.7 | 90.7 | 90.1 |
| | UV transmittance % | 0.102 | 0.040 | 0.055 | 0.034 | 0.090 | 0.135 | 0.054 |
| | Adhesiveness | Class 0 | Class 0 | Class 0 | Class 0 | Class 0 | Class 0 | Class 2 |
| | Weather resistance adhesiveness | Class 4 | Class 1 | Class 1 | Class 1 | Class 3 | Class 5 | Class 4 |
| | Steel wool resistance | ◎ | ◎ | ◎ | ◎ | ◎ | ◎ | ◎ |
| | Pencil hardness | 4H | 3H | 2H | 3H | 2H | 2H | 3H |

TABLE 2-continued

|  | Example 7 | Example 8 | Example 9 | Example 10 | Example 11 | Example 12 | Example 13 |
|---|---|---|---|---|---|---|---|
| Yellowness index | 0.8 | 1.6 | 1.3 | 2.0 | 0.9 | 0.7 | 1.4 |
| Yellowing resistance | 3.2 | 3.5 | 3.4 | 3.9 | 3.2 | 3.3 | 3.5 |
| Bending resistance | ◎ | ◎ | ◎ | ◎ | ◎ | ◎ | ◎ |
| Surface appearance | ◎ | ◎ | ◎ | ◎ | ◎ | ◎ | ◎ |
| Pressure-sensitive adhesive layer-forming coating material | S-1 | S-1 | S-1 | S-1 | S-1 | S-1 | S-1 |
| Result 2 Visible light transmittance % | 90.0 | 89.2 | 89.5 | 89.0 | 90.2 | 90.2 | 89.8 |
| UV transmittance % | 0.101 | 0.040 | 0.055 | 0.034 | 0.089 | 0.134 | 0.053 |
| Adhesive force N/inch | 17 | 17 | 17 | 17 | 17 | 17 | 17 |
| Weather resistance adhesive force N/inch | 25 | 26 | 29 | 32 | 28 | 25 | 26 |

From these results, it was found that the hard coat laminated film and the glass window film for exterior use according to the various embodiments have excellent weather resistance. It was found that the preferable hard coat laminated film and the preferable glass window film for exterior use according to the various embodiments are excellent in weather resistance, abrasion resistance, transparency, yellowing resistance, bending resistance at film bending, and external appearance.

REFERENCE SIGNS LIST

1 first hard coat
2 anchor coat
3 resin film layer
4 coat having infrared shielding function
5 pressure-sensitive adhesive layer

The invention claimed is:

1. An active energy ray curable resin composition comprising:
   (A) 100 parts by mass of a UV-absorbing polymer; and
   (B) 20-600 parts by mass of a polyfunctional (meth)acrylate, wherein the UV-absorbing polymer (A) is comprised of:
      (a1) 10-60 mol % of a structural unit derived from a (meth)acrylate having one or more of one or more types of backbones selected from the group consisting of a benzotriazole backbone, a triazine backbone, and a benzophenone backbone per molecule;
      (a2) 10-50 mol % of a structural unit derived from an alkyl (meth)acrylate; and
      (a3) 10-70 mol % of a structural unit derived from a compound containing one or more isocyanate groups per molecule; and
   the sum of the structural unit derived from a (meth)acrylate as component (a1), the structural unit derived from an alkyl (meth)acrylate as component (a2), and the structural unit derived from an isocyanate group-containing compound as component (a3) is 100 mol %.

2. A hard coat laminated film comprising a hard coat formed of a coating material containing the active energy ray curable resin composition according to claim 1.

3. A hard coat laminated film comprising a hard coat formed of a coating material containing the active energy ray curable resin composition according to claim 1 and a resin film layer in order from a surface on a side upon which sunlight is incident in an actual state of use.

4. A hard coat laminated film comprising a hard coat formed of a coating material containing the active energy ray curable resin composition according to claim 1, an anchor coat, and a resin film layer in order from a surface on a side upon which sunlight is incident in an actual state of use, wherein the anchor coat is formed of a coating material containing a polymer comprised of a structural unit derived from a (meth)acrylate having one or more of one or more types of backbones selected from the group consisting of a benzotriazole backbone, a triazine backbone, and a benzophenone backbone per molecule.

5. A glass window film for exterior use, comprising the hard coat laminated film according to any one of claims 2.

6. An article comprising a cured product of the active energy ray curable resin composition according to claim 1.

7. The active energy ray curable resin composition according to claim 1, wherein the UV-absorbing polymer (A) is further comprised of (a4) a structural unit derived from a hydroxyl group-containing (meth)acrylate.

8. The active energy ray curable resin composition according to claim 1, wherein the UV-absorbing polymer (A) is further comprised of (a4) a structural unit derived from a hydroxyl group-containing (meth)acrylate; and wherein upon production of the UV-absorbing polymer of component (A), the number of the hydroxyl groups derived from each monomer is 50 to 250 with the number of the isocyanate groups derived from each monomer being 100.

9. The active energy ray curable resin composition according to claim 1, wherein the (a3) compound containing one or more isocyanate groups per molecule comprises a compound having two or more isocyanate groups per molecule.

10. The active energy ray curable resin composition according to claim 1, wherein the (a3) compound containing one or more isocyanate groups per molecule comprises a compound having two or more polymerizable functional groups per molecule, at least one of the polymerizable functional groups being an isocyanate group.

11. The active energy ray curable resin composition according to claim 1, wherein the active energy ray curable resin composition is free of inorganic particles.

12. The hard coat laminated film according to claim 4, wherein the polymer contained in the coating material forming the anchor coat is comprised of:
   (p1) a structural unit derived from a (meth)acrylate having one or more of one or more types of backbones selected from the group consisting of a benzotriazole backbone, a triazine backbone, and a benzophenone backbone per molecule in an amount of 1-50 mol %;
   (p2) a structural unit derived from an alkyl (meth)acrylate in an amount of 30-95 mol %; and
   (p3) a structural unit derived from a hydroxyl group-containing (meth)acrylate in an amount of 1-50 mol %, provided that the sum of structural units derived from all constituent monomers is 100 mol %.

13. The hard coat laminated film according to claim 4, wherein the coating material forming the anchor further contains a compound having two or more isocyanate groups per molecule in an amount of 1-50 parts by mass with respect to 100 parts by mass of the polymer contained in the coating material.

14. A glass window film for exterior use, comprising: the hard coat laminated film according to claim 4; and a pressure-sensitive adhesive layer formed on a surface of the resin film layer of the hard coat laminated film opposite to a hard coat side surface of the resin film layer, wherein the pressure-sensitive adhesive layer contains an ultraviolet absorber in an amount of 0.01-50 parts by mass with respect to 100 parts by mass of a base resin of the pressure-sensitive adhesive layer.

15. The active energy ray curable resin composition according to claim 1, wherein the (a2) structural unit comprises a structural unit derived from a methyl (meth)acrylate.

\* \* \* \* \*